US009229249B2

(12) United States Patent
Akiyama

(10) Patent No.: US 9,229,249 B2
(45) Date of Patent: Jan. 5, 2016

(54) OPTICAL SEMICONDUCTOR DEVICE

(75) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 533 days.

(21) Appl. No.: 13/484,559

(22) Filed: May 31, 2012

(65) Prior Publication Data
US 2013/0037692 A1 Feb. 14, 2013

(30) Foreign Application Priority Data

Aug. 10, 2011 (JP) ................................. 2011-175007

(51) Int. Cl.
*G01J 1/18* (2006.01)
*G02F 1/01* (2006.01)

(52) U.S. Cl.
CPC ............ *G02F 1/0115* (2013.01); *G02F 1/0147* (2013.01); *G02F 2203/15* (2013.01)

(58) Field of Classification Search
CPC ........... G02F 1/01; G02F 1/011; G02F 1/015; G02F 1/0121; G02F 1/0147; G02F 2203/15
USPC ................. 250/201.1, 201.4, 227.11, 227.14, 250/227.18, 227.21, 227.24, 227.28, 214 R, 250/214 C; 385/2, 3, 14, 39, 50; 398/93, 95, 398/195, 196; 372/20, 29.011; 359/341.1
See application file for complete search history.

(56) References Cited

U.S. PATENT DOCUMENTS

| | | | | |
|---|---|---|---|---|
| 6,411,752 | B1 * | 6/2002 | Little et al. ....................... | 385/17 |
| 6,636,668 | B1 * | 10/2003 | Al-hemyari et al. ............. | 385/40 |
| 7,162,120 | B2 * | 1/2007 | Yamazaki ......................... | 385/27 |
| 7,231,113 | B2 * | 6/2007 | Chu et al. ......................... | 385/30 |
| 7,356,221 | B2 * | 4/2008 | Chu et al. ......................... | 385/30 |
| 7,583,879 | B2 * | 9/2009 | Chu et al. ....................... | 385/129 |

(Continued)

FOREIGN PATENT DOCUMENTS

| | | |
|---|---|---|
| CN | 101046529 A | 10/2007 |
| JP | 2005-528651 A1 | 9/2005 |

(Continued)

OTHER PUBLICATIONS

Chinese Office Action dated Aug. 26, 2014 in the corresponding Chinese patent application No. 201210272727.6, with English translation.

(Continued)

*Primary Examiner* — John Lee
(74) *Attorney, Agent, or Firm* — Kratz, Quintos & Hanson, LLP

(57) ABSTRACT

An optical semiconductor device includes a waveguide that an input light to be inputted, a ring modulator optically coupled with the waveguide, a first ring resonator optically coupled with the waveguide and having an optical path length smaller than an optical path length of the ring modulator, a second ring resonator optically coupled with the first waveguide and having an optical path length larger than the optical path length of the ring modulator, a heater arranged adjacent to the ring modulator, the first ring resonator and the second ring resonator, a first photodetector monitoring a light power in the first ring resonator, a second photodetector monitoring a light power in the second ring resonator, and a controller controlling the heater so that a resonance wavelength of the ring modulator agrees with a wavelength of the input light, based on signals detected by the first and second photodetectors.

14 Claims, 27 Drawing Sheets

(56) References Cited

U.S. PATENT DOCUMENTS

| | | | |
|---|---|---|---|
| 7,903,910 B2* | 3/2011 | Chu et al. | 385/30 |
| 7,977,622 B2* | 7/2011 | McLaren et al. | 250/227.11 |
| 8,295,655 B2* | 10/2012 | Manipatruni et al. | 385/3 |
| 8,519,803 B2* | 8/2013 | McLaren et al. | 333/17.1 |
| 8,582,937 B2* | 11/2013 | Xu | 385/50 |
| 8,606,055 B2* | 12/2013 | Lipson et al. | 385/2 |
| 8,615,173 B1* | 12/2013 | Lentine et al. | 398/198 |
| 8,644,657 B2* | 2/2014 | Park et al. | 385/16 |
| 8,768,170 B2* | 7/2014 | Krishnamoorthy et al. | 398/79 |
| 2005/0013537 A1* | 1/2005 | Yamazaki | 385/27 |
| 2006/0051010 A1* | 3/2006 | Chu et al. | 385/5 |
| 2007/0230856 A1 | 10/2007 | Yamazaki | |
| 2008/0175538 A1* | 7/2008 | Chu et al. | 385/30 |
| 2009/0169149 A1 | 7/2009 | Block | |
| 2010/0098372 A1* | 4/2010 | Manipatruni et al. | 385/2 |
| 2010/0200733 A1* | 8/2010 | McLaren et al. | 250/214 C |
| 2010/0329685 A1* | 12/2010 | Zheng et al. | 398/83 |
| 2011/0058765 A1* | 3/2011 | Xu | 385/2 |
| 2011/0142391 A1 | 6/2011 | Asghari et al. | |
| 2012/0207479 A1* | 8/2012 | Krishnamoorthy et al. | 398/85 |
| 2013/0037692 A1* | 2/2013 | Akiyama | 250/201.1 |
| 2013/0044973 A1* | 2/2013 | Akiyama | 385/2 |
| 2014/0064734 A1* | 3/2014 | Witzens | 398/79 |

FOREIGN PATENT DOCUMENTS

| | | |
|---|---|---|
| JP | 2008-268276 | 11/2008 |
| WO | 03/103206 A1 | 12/2003 |

OTHER PUBLICATIONS

Notification of Reason(s) for Refusal of Corresponding Japanese Patent Application No. 2011-175007 dated Feb. 3, 2015 with partial English translation.

* cited by examiner

OPTICAL SEMICONDUCTOR DEVICE

CROSS-REFERENCE TO RELATED APPLICATION

This application is based upon and claims the benefit of priority of the prior Japanese Patent Application No. 2011-175007, filed on Aug. 10, 2011, the entire contents of which are incorporated herein by reference.

FIELD

The embodiments discussed herein are related to an optical semiconductor device.

BACKGROUND

For downsizing, large capacity and low power consumption of an optical transmitter and receiver, it plays an important role to realize an optical device on silicon. The optical device on silicon, which can use optical waveguide of large refractive index difference, is advantageous in the downsizing in comparison with optical devices on other materials, which facilitates the integration with other electronic circuits, whereby a number of optical transmitters and receivers can be integrated on 1 chip. Of the optical devices, especially the modulator has the characteristics influential on the power consumption and size of the optical transmitter and receiver. Especially, the ring modulator, which is small-sized itself and has a small modulator voltage and a small optical insertion loss, is advantageous in the downsizing and low power consumption.

The followings are examples of related: U.S. Patent Publication No. 2009/0169149 A1; and Japanese Laid-open Patent Publication No. 2008-268276.

However, the ring modulator has the problem of making the modulation efficiency high narrowing the wavelength band.

SUMMARY

According to one aspect of an embodiment, there is provided an optical semiconductor device including a first waveguide that an input light to be input into, a ring modulator arranged to optically couple with the first waveguide, a first ring resonator arranged to optically couple with the first waveguide and having an optical bath length smaller than an optical path length of the ring modulator, a second ring resonator arranged to optically couple with the first waveguide and having an optical wavelength larger than the optical path length of the ring modulator, a heater arranged adjacent to the ring modulator, the first ring resonator and the second ring resonator, a first photodetector configured to monitor a light power in the first ring resonator, a second photodetector configured to monitor a light power in the second rind resonator, and a controller controlling the heater so that a resonance wavelength of the ring modulator agrees with a wavelength of the input light, based on signals detected by the first photodetector and the second photodetector.

The object and advantages of the embodiment will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

A First Embodiment

An optical semiconductor device according to a first embodiment will be described with reference to FIGS. 1 to 14.

Figure 1:
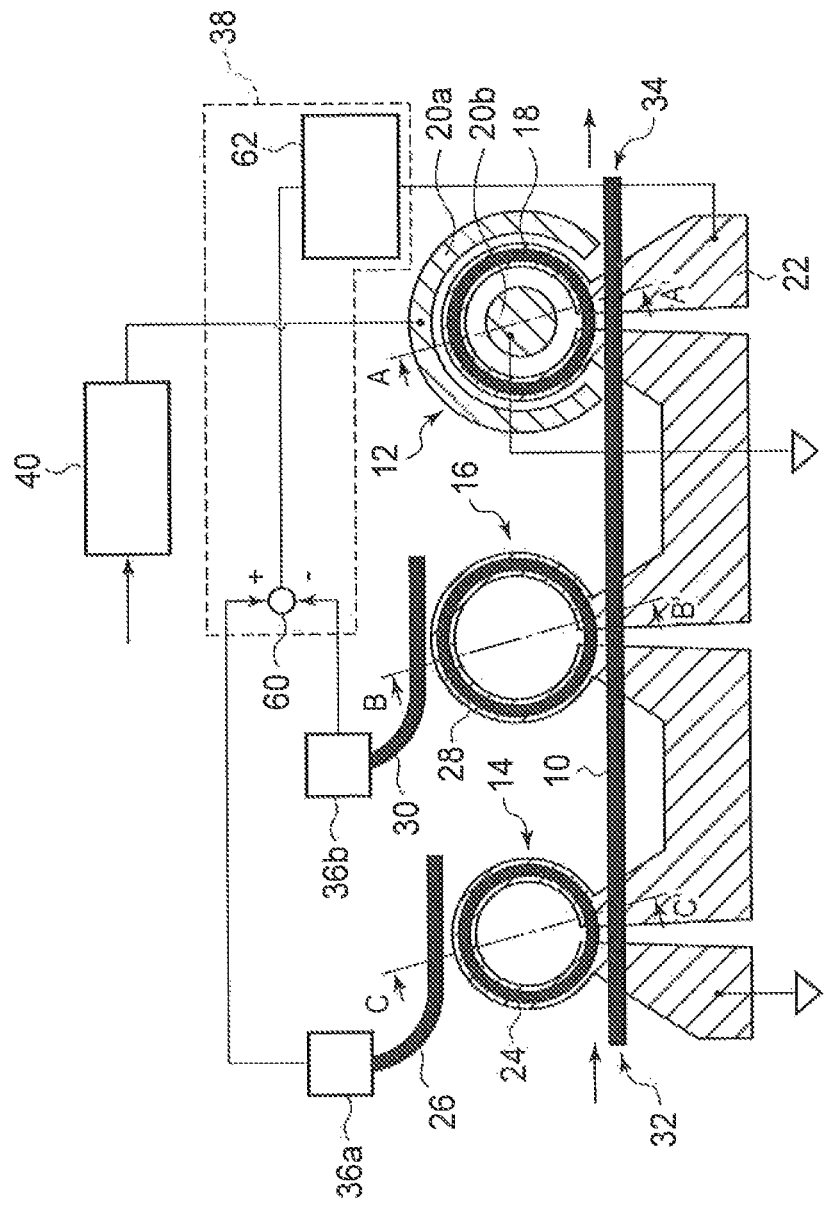
FIG. 1 is a diagrammatic view illustrating an optical semiconductor device according to a first embodiment.
Figure 2:
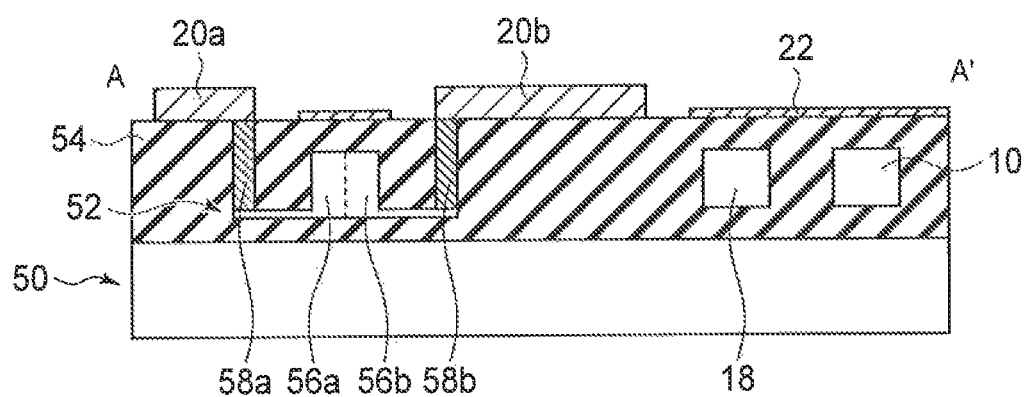
FIGS. 2, 3 and 4 are cross-sectional views illustrating the optical semiconductor according to the first embodiment.
Figure 3:
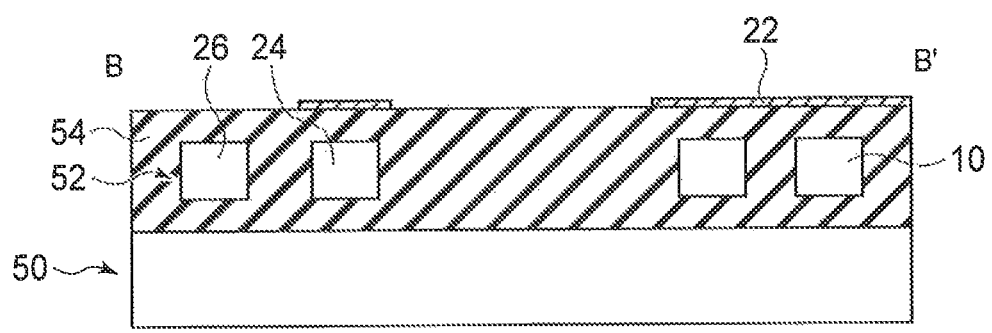
Figure 4:
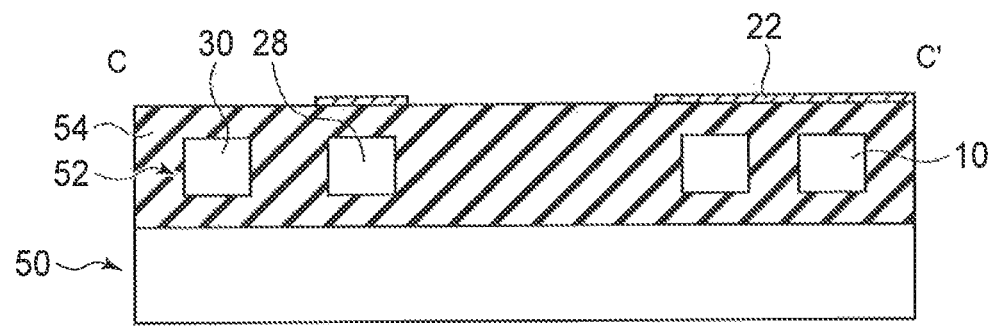
Figure 5:
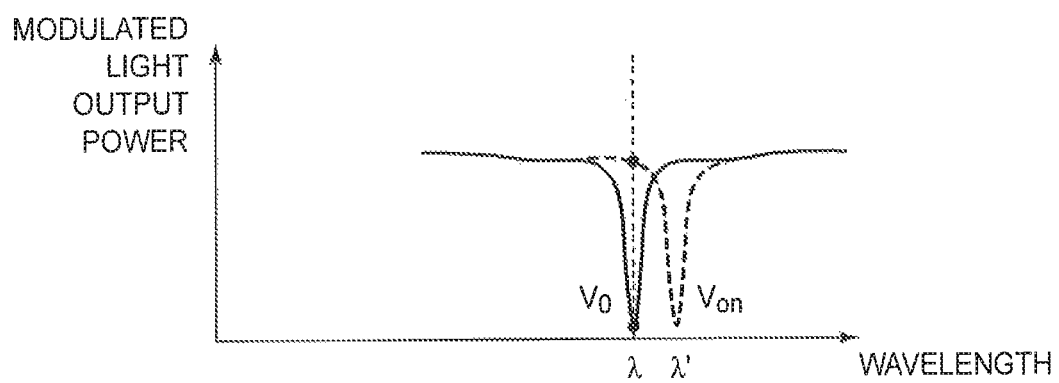
FIGS. 5, 6, 10 and 11 are graphs illustrating relationships between a modulated light output power of an optical resonator and a wavelength of an input light.
Figure 6:
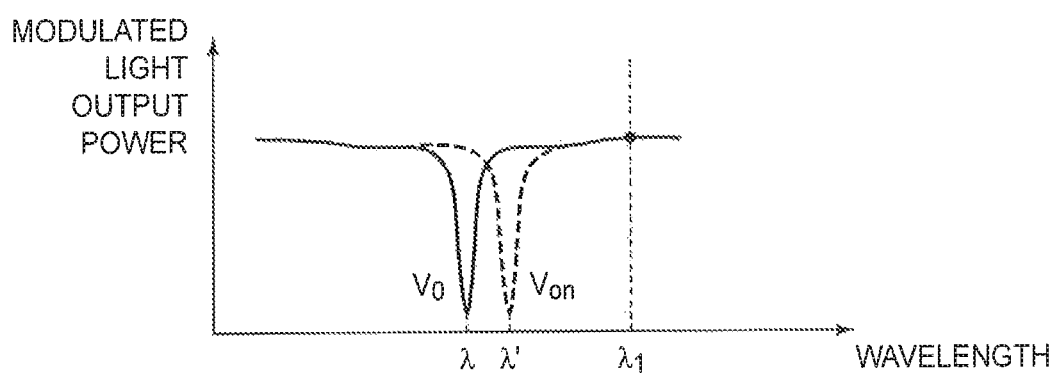
Figure 7:
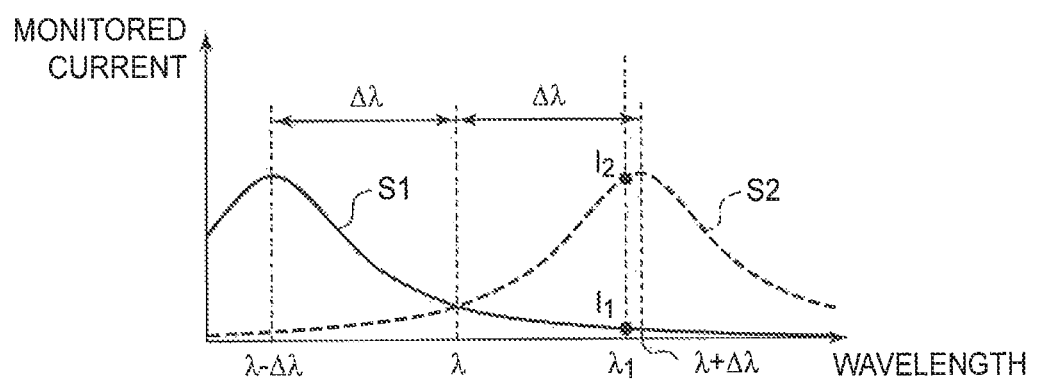
FIGS. 7, 8 and 20 are graphs illustrating relationships between a monitored current and a wavelength of an input light.
Figure 8:
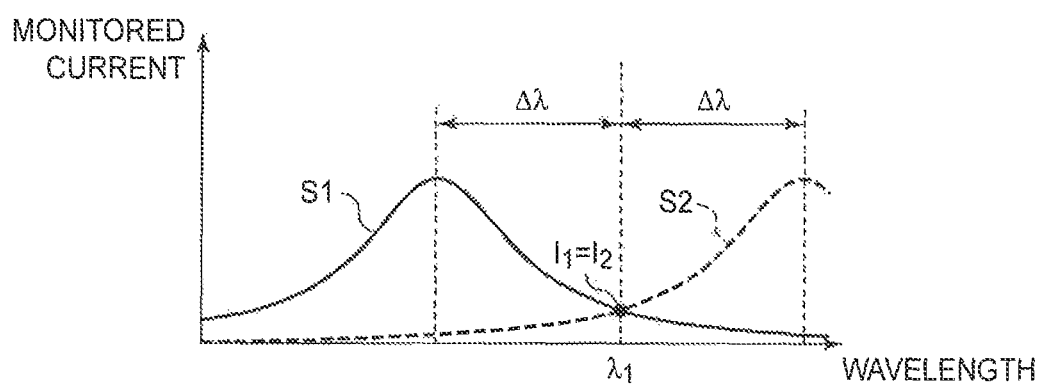
Figure 9:
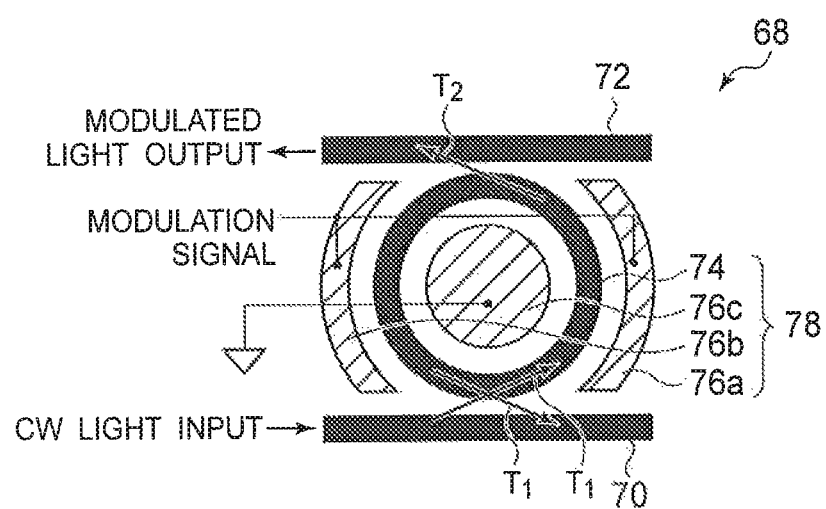
FIGS. 9 and 13 are diagrammatic views illustrating optical semiconductor devices according to reference embodiments.
Figure 12:
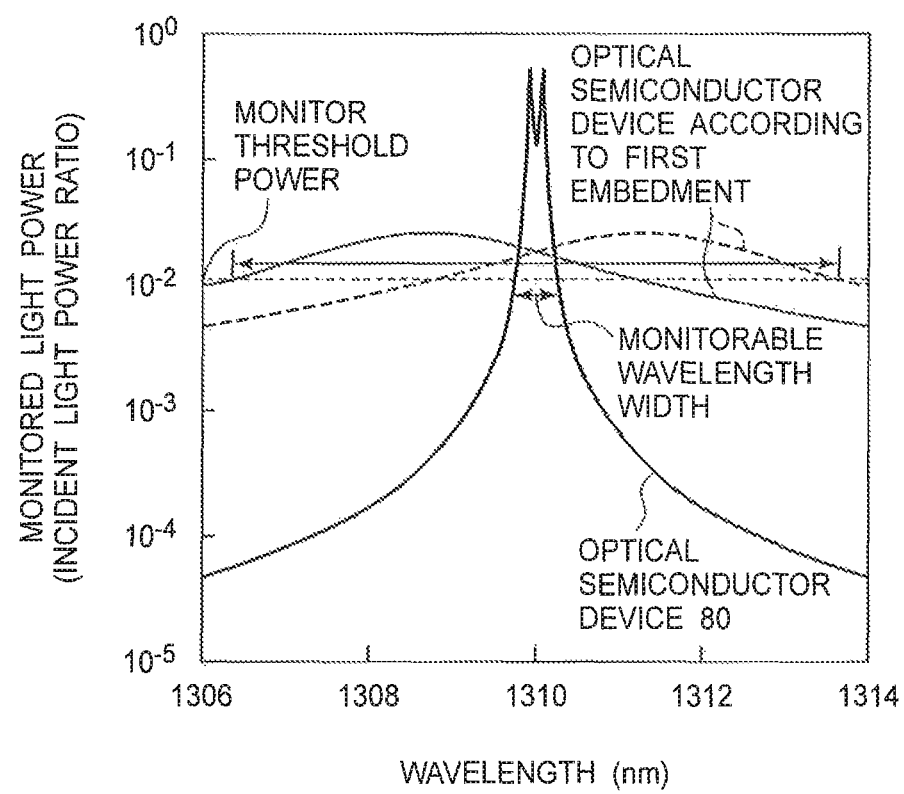
FIG. 12 is a graph illustrating relationships between a monitored light power and a wavelength of an input light.
Figure 13:
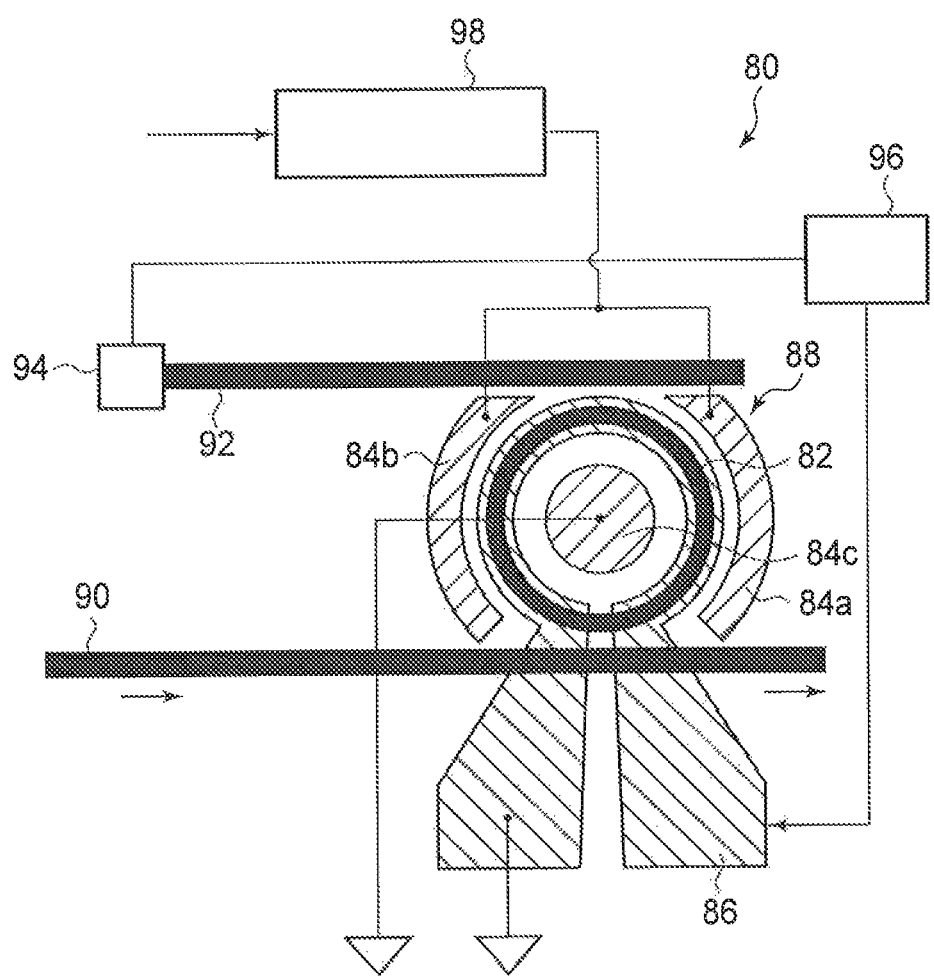
Figure 14:
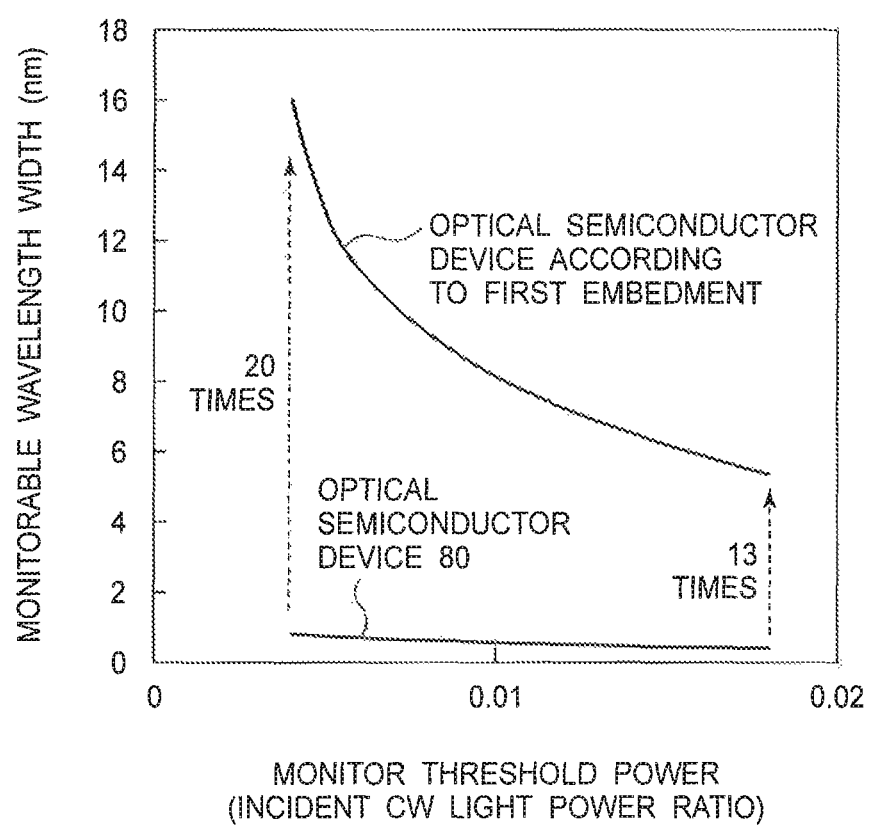
FIG. 14 is a graph illustrating relationships between a monitorable wavelength width and a wavelength of an input light.

FIG. 1 is a diagrammatic view illustrating an optical semiconductor device according to the present embodiment. FIGS. 2 to 4 are cross-sectional views illustrating the optical semiconductor according to the present embodiment. FIGS. 5, 6, 10 and 11 are graphs illustrating relationships between a modulated light output power of an optical resonator and a wavelength of an input light. FIGS. 7 and 8 are graphs illustrating relationships between a monitored current and a wavelength of an input light. FIGS. 9 and 13 are diagrammatic views illustrating optical semiconductor devices according to reference embodiments. FIG. 12 is a graph illustrating relationships between a monitored light power and a wavelength of an input light. FIG. 14 is a graph illustrating relationships between a monitorable wavelength width and a wavelength of an input light.

First, a structure of the optical semiconductor device according to the present embodiment will be described with reference to FIGS. 1 to 4. FIG. 2 is the cross-sectional view along A-A' line in FIG. 1. FIG. 3 is the cross-sectional view along BB' line in FIG. 1. FIG. 4 is the cross-sectional view along C-C' line in FIG. 1.

As illustrated in FIG. 1, the optical semiconductor device according to the present embodiment includes a linear waveguide 10, and a first optical resonator 12, a second optical resonator 14, and a third optical resonator 16 arranged near the linear waveguide 10 so as to be optically coupled to the linear waveguide 10. The optical semiconductor device according to the present embodiment also includes photodetectors 36a, 36b respectively including waveguides 26, 30, a controller 38 which controls a heater 22 based on a signal detected by the photodetectors 36a, 36b (monitored current), and a driver circuit 40 which outputs a modulated signal.

On the side of the input end 32 of the linear waveguide 10 CW (Continuous Wave) light which is input light is to be inputted into, the second optical resonator 14 and the third optical resonator 16 are arranged adjacent each other. On the side of the output end 34 of the linear waveguide 10, the first optical resonator 12 is provided.

The first optical resonator 12 includes a ring waveguide 18 and the heater 22 arranged near the ring waveguide 18. To the ring waveguide 13, electrodes 20a, 20b which applies a signal (modulation signal) for varying refractive index of the ring waveguide 18 are connected. That is, the first optical resonator 12 functions as a ring modulator.

The second optical resonator 14 includes a ring waveguide 24 and the heater 22 arrange near the ring waveguide 24. The optical resonator formed of the ring waveguide is often called the ring resonator.

The third optical resonator 16 includes a ring waveguide 28 and the heater 22 arranged near the ring waveguide 28.

The heater 22 arranged near the ring waveguides 18, 24, 28 is a single heater and can heat simultaneously the ring waveguides 18, 24, 28. The heater 22 may be discretely provided near the ring waveguides 18, 24, 28, respectively.

The diameter of the ring waveguides 18, 24, 28 is set respectively at d, d−Δd and d+Δd. For example, when d=10 μm, Δd=0.015 μm, the diameter of the ring waveguide 18 is 10 μm, the diameter of the ring waveguide 24 is 9.985 μm, and the diameter of the ring waveguide 28 is 10.015 μm.

The interval between the linear waveguide 10 and the ring waveguide 18 is set larger than the intervals between the linear waveguide 10 and the ring waveguides 24, 28. For example, the interval between the linear waveguide 10 and the ring waveguide 18 is set at 250 nm. The intervals between the linear waveguide 10 and the ring waveguide 24 and the interval between the linear waveguide 10 and the ring waveguide 28 are set at 100 nm.

To the second optical resonator 14, the photodetector 36a is connected via the waveguide 26 optically coupled to the ring waveguide 24.

The optical waveguide structure illustrated in FIG. 1 can be formed of, e.g., the SOT (Silicon On Insulator) layer 52 of the SOI substrate 50.

As exemplified in FIGS. 2 to 4, the linear waveguide 10, the ring waveguides 18, 24, 28 and the waveguides 26, 30 can be formed by patterning the SOI layer 52. A silicon oxide layer 54 is formed around the SOI layer 52 and functions as the clad enclosing the linear waveguide 10, the ring waveguides 18, 24, 28 and the waveguides 26, 30.

In a partial region of the ring waveguide 18, an n-type region 56a and a p-type region 56b are formed along the transmission direction of the light respectively on the outer peripheral side and the inner peripheral side. The n-type region 56a and the p-type region 56b may be oppositely positioned.

Above the silicon oxide layer 54, an electrode 20a connected to the n-type region 56a of the ring waveguide 16 via a via-interconnection 58a, and an electrode 20b connected to the p-type region 56b of the ring waveguide 18 via a via-interconnection 58b are formed. The electrode 20a is connected to a driver circuit 40. The electrode 20b is connected to a ground line. The electrodes 20a, 20b are formed of, e.g., aluminum. The via-interconnections 58a, 58b are formed of, e.g., tungsten.

Above the silicon oxide layer 54, the heater 22 is formed. As the heater 22, a platinum thin film heater, for example, can be used.

The controller 38 includes a current subtraction circuit 60 connected to the photodetectors 36a, 36b, a PID (Proportional Integral Differential) control circuit 62 connected to the current subtraction circuit 60. The PID control circuit is one kind of the feedback control circuits and controls an input value, based on three elements, a deviation, an integral and a differential between an output value and a target value. Thus, based on output signals from the photodetector 36a and the photodetector 36b, the heater 22 can be controlled by the PID control circuit 62.

The driver circuit 40 is connected to the electrode 20a and can input a modulation signal into the ring waveguide 18 via the electrode 20a.

Next, the operation of the optical semiconductor device according to the present embodiment will be described.

First, an input light, CW light of a wavelength $\lambda_1$, is inputted into the linear waveguide 10 at the input end 32. The intensity of the output light to be outputted from the linear waveguide 10 at the output end 34 varies, depending on a relationship between the wavelength of the CW light and a resonance wavelength of the ring waveguide 18.

When the wavelength of the CW light and the resonance wavelength of the ring waveguide 18 agree with each other, the transmittance from the linear waveguide to the ring waveguide 18 becomes maximum, and the intensity of the CW light (modulated light output power) to be outputted from the output end 34 becomes minimum. The transmittance from the linear waveguide 10 to the ring waveguide 18 becomes smaller as the wavelength of the CW light shifts from the resonance wavelength of the ring waveguide 18. Resultantly, the relationship between the wavelength of the input light and the intensity of the output light represents a modulated light output power curve as illustrated by the solid line in FIG. 5.

The resonance wavelength of the ring waveguide 18 can be changed by varying the refractive index in the ring waveguide 18 by applying a voltage between the electrodes 20a, 20b. For example, when a voltage $V_{on}$ is applied between the electrodes 20a, 20b, the resonance wavelength of the ring waveguide 18 shifts toward the longer wavelength site to be $\lambda'$, and, as illustrated by the dotted line in FIG. 5, the modulated light output power curve shifts to the longer wavelength side by an increase of the resonance wavelength.

Here, when the wavelength $\lambda_1$ of the CW light as input light is λ, the voltage to be applied between the electrodes 20a, 20b is changed, and the intensity of the output light can be varied. For example, without a voltage applied between the electrodes 20a, 20b (voltage $V_0$), the output power corresponding to the ● mark on the solid line in FIG. 5 can be obtained. With a voltage applied between the electrodes 20a, 20b (voltage $V_{on}$), the output power corresponding to the ● mark on the dotted line in FIG. 5.

As described above, the optical semiconductor device according to the present embodiment outputs the input light intensity modulated. To make the modulation efficiency of the optical semiconductor device high, it is preferable that without a voltage applied, the intensity of output light is minimum, that is, the resonance wavelength of the ring waveguide 18 agrees with the wavelength of the input light.

However, the wavelength of the CW light and the resonance wavelength of the ring waveguide 18 does not always agree with each other due to manufacture fluctuations, environmental temperatures, etc. When the wavelength of the CW light and the resonance wavelength of the ring waveguide 16 do not agree with each other, as exemplified in FIG. 6, often the modulated light output power does not have a sufficient change even a voltage is applied to the ring waveguide 18.

For such case, in the optical semiconductor device according to the present embodiment, the device is adjusted so as to agree the wavelength of the CW light and the resonance wavelength of the ring waveguide 18 with each other by using the second optical resonator 14, the third optical resonator 16 and the heater 22.

The CW light inputted into the linear waveguide 10 is guided not only to the ring waveguide 18 but also to the ring waveguides 24, 28. The CW light guided to the ring waveguides 24, 28 is guided to the waveguides 26, 30 to be detected by the photodetectors 36a, 36b.

The monitored currents I1, I2 detected by the photodetectors 36a, 36b have the wavelength characteristics as illustrated in FIG. 7. That is, the monitored current curve S1 representing the wavelength characteristic of the monitored current I1 indicates a maximum value at the wavelength $\lambda-\Delta\lambda$, and the monitored current curve S2 representing the wavelength characteristic of the monitored current I2 indicates a maximum value at the wavelength $\lambda+\Delta\lambda$. The monitored current curves S1, S2 indicate the maximum values at the wavelengths $\lambda-\Delta\lambda$, $\lambda+\Delta\lambda$ because the diameters of the ring waveguides 18, 24, 28 are set at d, d$-\Delta$d, d$+\Delta$d.

When the effective refractive index of the ring waveguides 18, 24, 28 is n, the optical distances (optical path lengths) of the ring waveguides 18, 24, 28 are expressed respectively by $2\pi nd$, $2\pi n(d-\Delta d)$ and $2\pi n(d+\Delta d)$, Because the resonance wavelengths correspond to 1 over integers of the optical distance, when one of the resonance wavelengths of the ring waveguide 18 is the resonance wavelengths of the ring waveguides 24, 28 are expressed respectively by $\lambda-\Delta\lambda$ and $\lambda+\Delta\lambda$, because the resonance wavelengths correspond to 1 over integers of the optical distance. For example, when the diameter of the ring waveguide 18 is 10 μm, with the resonance wavelength of the ring waveguide 18 being 1310 nm, the resonance wavelength of the ring waveguide 24 is 1308 nm and the resonance wavelength of the ring waveguide 28 is 1312 nm.

The monitored current curve S1 and the monitored current curve S2 intersect at the wavelength $\lambda$, which is the resonance wavelength, of the ring waveguide 18. This can be realized by setting the diameter of the second optical resonator 14 smaller by $\Delta$d than the diameter of the first optical resonator 12 and setting the diameter of the third optical resonator 16 larger by $\Delta$d than the diameter of the first optical resonator 12. The associated characteristics for realizing this is that the interval between the linear waveguide 10 and the ring waveguide 24 is equal to the interval between the linear waveguide 10 and the ring waveguide 28, and the interval between the ring waveguide 24 and the waveguide 26 is equal to the interval between the ring waveguide 28 and the waveguide 30. The interval between the ring waveguide 24 and the waveguide 26 and the interval between the ring waveguide 28 and the waveguide 30 are set at e.g., 100 nm.

The monitored currents I1, I2 detected by the photodetectors 36a, 36b are converted by the current subtraction circuit 60 to a current I3 given by subtracting the monitored current I2 from the monitored current I1.

The PID control circuit 62 so controls the heater 22 that current I3 becomes zero, based on the current I3 generated by the current subtraction circuit 60. That is, the PID control circuit 60 feedback-controls the heater 22 so that the monitored current I1 and the monitored current I2 become equal to each other.

When the current I3 is not zero, i.e., when the monitored current I1 and the monitored current I2 are not equal to each other, the PID control circuit 60 judges that the wavelength $\lambda_1$ of the input light and the resonance wavelength $\lambda$ of the first optical resonator 12 are not in agreement with each other and outputs a drive signal to the heater 22.

For example, as shown in FIG. 7, when the wavelength $\lambda_1$ of the input light has a value near the resonance wavelength $\lambda+\alpha\lambda$, the monitored current I2 becomes larger than the monitor current I1, and the current I3 does not become zero. At this time, the PID control circuit 62 outputs to the heater 22 a drive signal corresponding to a current of the current I3, i.e., a dissociation width between the wavelength $\lambda_1$ and the wavelength $\lambda$.

Because of the positive temperature coefficient of the refractive index of silicon which is the material forming the ring waveguides 24, 28, as the temperature of the ring waveguides 24, 28 increases, the resonance wavelengths of the second optical resonator 14 and the third optical resonator 16 shift to the long-wavelength side. That is, the monitored current curves S1, S2 shift to the long-wavelength side.

The PID control circuit 62 again measures the current I3 in the heated state by the heater 22 to check whether or not the current I3 becomes zero. When the current I3 is zero, the PID control circuit 62 retains the drive signal outputted to the heater 22. When the current I3 is not zero, the PID control circuit 62 suitably increases or decreases the drive signal for the heater 22 corresponding to a value of the current I3. The PID control circuit 62 continuously makes the feedback-control to control the heater 22 to stabilize the current I3 near zero.

When the current I3 is zero, the wavelength $\lambda$ of the signal light positions at the intersection between the monitored current curve S1 and the monitored current curve S2. Because the ring waveguide 18 is heated together with the ring waveguide 24 and the ring waveguide 28, the resonance wavelength $\lambda$ also shifts in the same direction and at the same ratio as the resonance wavelength of the second optical resonator 14 and the resonance wavelength of the third optical resonator 16. Thus, the wavelength $\lambda_1$ of the input light and the resonance wavelength $\lambda$ of the first optical resonator 12 can be brought into agreement with each other.

The optical waveguide formed of silicon has the property that the resonance wavelength shifts to the long-wavelength side as the temperature is higher, and what can be controlled by the heater 22 is only to shift the resonance wavelengths of the optical resonators to the long-wavelength side. In order to agree the resonance wavelengths of the optical resonators with the wavelength of the signal light, it is preferable that the resonance wavelength of the ring waveguide 18 is arranged in advance to position at a shorter wavelength side than the wavelength of the input light.

In controlling the heater 22 by using the monitored currents I1, I2, it is preferable that the wavelength band (width of wavelengths which can be monitored) where the monitored currents I1, I2 can be detected is as wide as possible. In view of this, in the present embodiment, the interval between the linear waveguide 10 and the ring waveguides 24, 28 is set narrower than the interval, between the linear waveguide 10 and the ring waveguide 18.

The reason for setting the intervals between the linear waveguide 10 and the ring waveguides 24, 28 smaller than the interval between the linear waveguide 10 and the ring waveguide 18 will be described in comparison with the optical semiconductor devices 68, 80 of the reference embodiments illustrated in FIGS. 9 and 13.

The optical semiconductor device 68 illustrated in FIG. 9 includes linear waveguides 70, 72, and a ring waveguide 74 provided between the linear waveguides 70, 72. CW light inputted into the linear waveguide 70 at one end is guided to the ring waveguides 74 and modulated by a modulation signal applied between electrodes 76a, 76b and an electrode 76c. The modulated. CW light is guided to the linear waveguide 72 and outputted from the linear waveguide 72 at one end.

The optical semiconductor device 80 illustrated in FIG. 13 includes linear waveguides 90, 92, and a ring waveguide 82 provided between the linear waveguides 90, 92. CW light inputted into the linear waveguide 90 at one end is outputted from the linear waveguide 90 at the other end. The resonance wavelength of the ring waveguide is changed by a modulation signal applied between electrodes 84a, 84b and an electrode 84c to thereby modulate the output light to be outputted from the linear waveguide 90 at the other end. In this optical semiconductor device 80, a controller 96 controls a heater 86, based on a monitored current detected by a photodetector 94 connected to the linear waveguide 92 to thereby bring the resonance wavelength of the ring waveguide 82 to the wavelength of the CW light.

In the optical semiconductor device illustrated in FIG. 9, the power permeability to be set by the interval between the linear waveguide 70 and the ring waveguide 74 is T1, and the power permeability to be set between the linear waveguide 72 and the ring waveguide 74 is T2. The power permeability is a ratio of light propagated from a waveguide to another waveguide. The power permeability is higher as the interval between the waveguides is smaller. The wavelength band of the peak of a modulated light output power is wider as the power permeability is higher, i.e., the interval between the waveguides is smaller.

Figure 10:
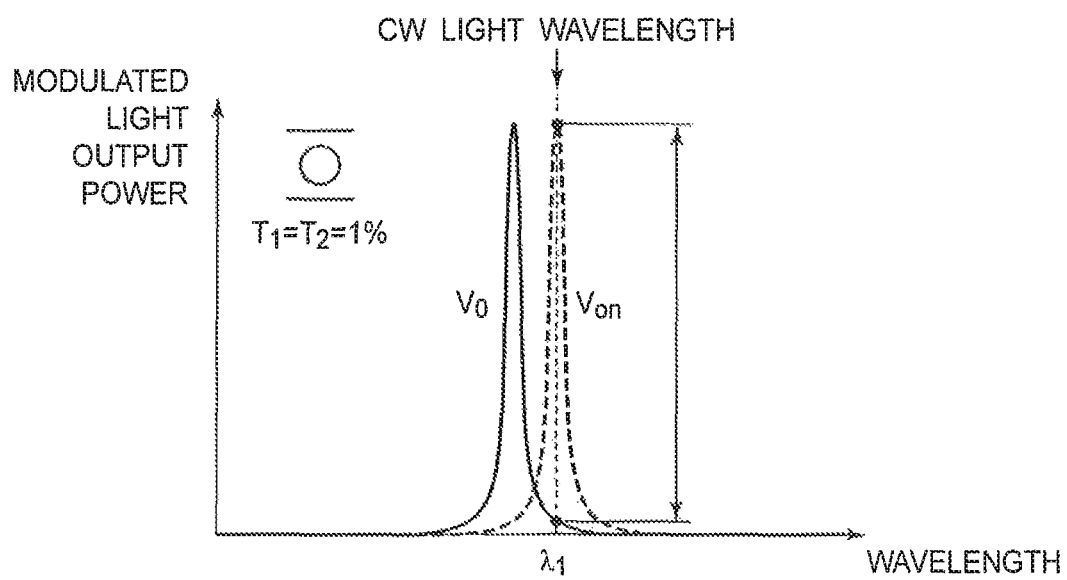

When the power permeability is low, e.g., T1=T2=1%, the modulated light output power curve as illustrated in FIG. 10 can be obtained. In the state that no modulation signal is applied to the ring waveguide 74 (voltage $V_0$), the modulated light output power curve indicated by the solid line can be obtained. In the state that a modulation signal is applied to the ring waveguides 74 (voltage $V_{on}$), the modulated light output power indicated by the dotted line can be obtained.

As illustrated, when the power permeability is low, the peak of the modulated light output power curve is steep, and the wavelength band of the peak of the modulated light output power curve is narrow. This means that a change of the modulated light output power to a change of the modulated signal is large, and the steep modulated light output power curve is effective to improve the modulation efficiency of the optical semiconductor device. That is, the absence and presence of the modulated signal largely changes the modulated light output power as in the range indicated by the arrows in, e.g., FIG. 10.

Such characteristic is the same with the optical semiconductor device according to the present embodiment. That is, in the optical semiconductor device according to the present embodiment as well, to make the peak of the modulated light output power curve steep as shown in FIG. 10, it is preferable to set the power permeability between the liner waveguide 10 and the ring waveguide 18 at a low value.

Figure 11:
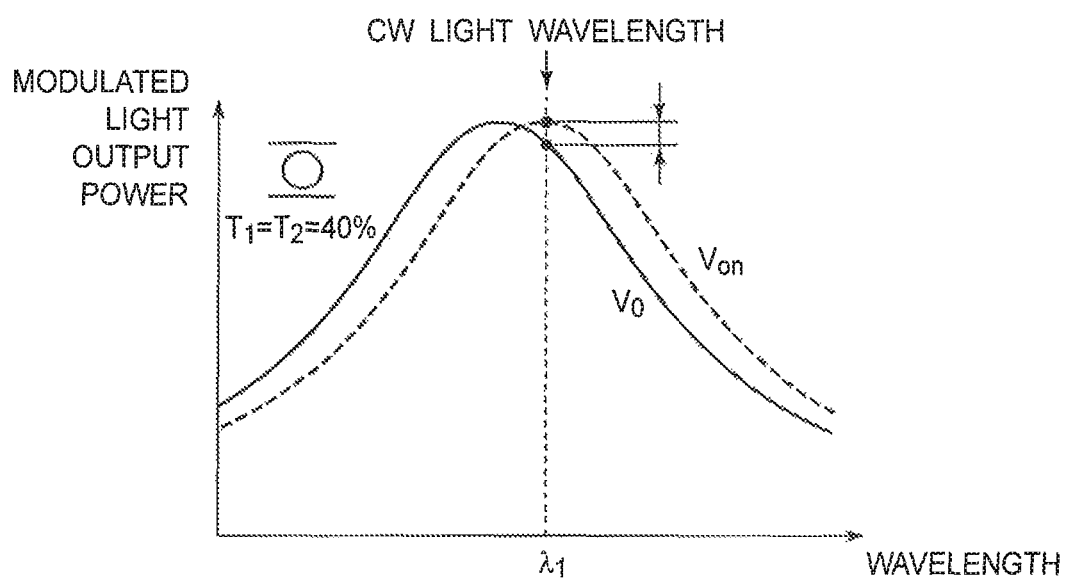

On the other hand, when the power permeability is high, e.g., T1=T2=40%, the modulated light output power curve as illustrated in FIG. 11 can be obtained. In the state that no modulation signal is applied to the ring waveguide 74, (voltage $V_0$), the modulated light output power indicated by the solid line can be obtained. In the state that a modulated signal is applied to the ring waveguide 74 (voltage $V_{on}$), the modulated light output power curve indicated by the dotted line can be obtained.

As described above, when the power permeability is high, a change of the modulated light output power to a change of the wavelength is small, and as indicated by the range indicated by the arrows in FIG. 11, it cannot be said that the modulation efficiency is high. On the other hand, the wavelength band of the peak of the modulated light output power is wide, which is preferable in terms of monitoring the modulated light output power in the wide wavelength range. As the width of the wavelengths which can be monitored is wider, the allowance of the deviation between the wavelength of the input light, and the resonance wavelength of the optical resonator 18 can be made large.

That is in the optical semiconductor device according to the present embodiment, to make the peak of the modulated light output power curve smooth as illustrated in FIG. 11 to thereby widen the monitorable wavelength width, it is preferable that the power permeability between the linear waveguide 10 and the ring waveguide 24 and between the linear waveguide 10 and the ring waveguide 28 is set at a high value.

in the optical semiconductor device 80 illustrated in FIG. 13, when the power permeability between the ring waveguide 82 and the linear waveguides 90, 92 is 1%, the monitored light power detected by the photodetector 94 is as illustrated in FIG. 12. When the monitor threshold power is about $10^{-2}$, the monitorable wavelength width is about 0.5 nm.

In the optical semiconductor device according to the present embodiment, however, with the power permeability between the linear waveguide 10 and the ring waveguides 24, 28 set 80%, the monitored light power to be detected by the photodetectors 36a, 36b is as illustrated in FIG. 12. When the monitor threshold power is about $10^{-2}$, the monitorable wavelength width is about 7.5 nm.

As illustrated in FIG. 14, the monitorable wavelength width of the optical semiconductor device is larger as the monitor threshold power is smaller. According to the optical semiconductor device of the present embodiment, the monitorable wavelength width can be improved by about 13-20 times the monitorable wavelength width of the optical semiconductor device 80.

In the optical semiconductor device according to the present embodiment, the optical resonator 12 for the light modulation is independently provided, and the power permeability between the linear waveguide 10 and the ring waveguide 18 can be set independently of the power permeability between the linear waveguide 10 and the ring waveguides 24, 28. Thus, the monitorable wavelength width can be widened, and the modulation efficiency can be improved.

As described above, in the present embodiment, in addition to the optical resonator 12 for modulating the input light, the optical resonators 14, 16 whose resonance wavelengths are shorter and longer than the resonance wavelength of the optical resonator 12 are provided. The temperature control is so made that a resonance wavelength of the optical resonator 12 agrees with a wavelength of the input light by using output signals from the optical resonators 14, 16. Thus, according to the optical semiconductor device of the present embodiment, while wavelength deviations between the input light and the optical resonator 12 are allowed in a wide range, the resonance wavelength of the optical resonator 12 can be easily agreed with the wavelength of the input light. The resonance of the optical resonator can be improved, which can improve the modulation efficiency.

A Second Embodiment

An optical semiconductor device according to a second embodiment will be described with reference to FIG. 15. The same members of the present embodiment as those of the optical semiconductor device according to the first embodiment illustrated in FIGS. 1 to 14 are represented by the same reference numbers not to repeat or to simplify the description.

Figure 15:
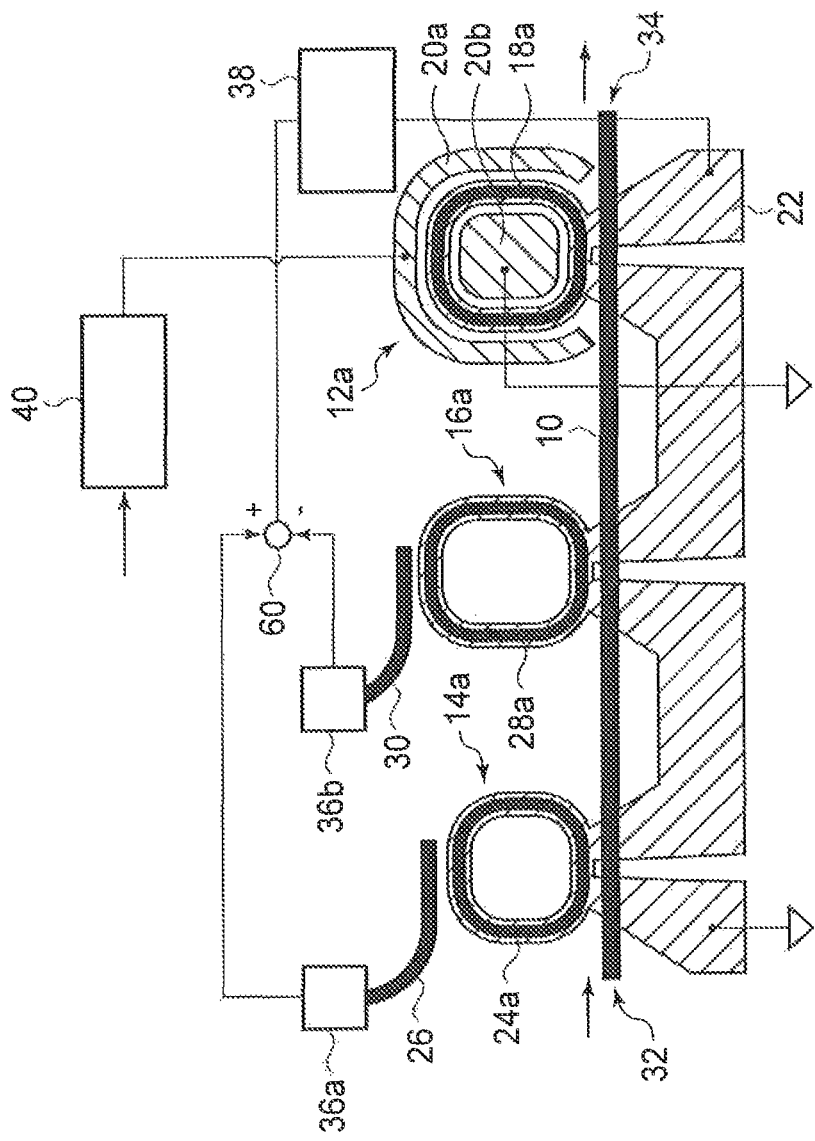
FIG. 15 is a diagrammatic view illustrating an optical semiconductor device according to a second embodiment.

FIG. 15 is a diagrammatic view illustrating the optical semiconductor device according to the present embodiment.

The optical semiconductor device according to the present embodiment is the same as that optical semiconductor device according to the first embodiment except in the plane configuration of the ring waveguides.

That is, the optical semiconductor device according to the present embodiment includes, in place of the ring waveguides 18, 24, 28, ring waveguides 18a, 24a, 28a each has the structure of the combination of 4 linear portions and 4 arc-shaped portions.

The arc-shaped portions of the ring waveguides 18a, 24a, 28a are a quarter of a circle of a radius r. The linear portions are arranged between the arc-shaped portions, and the lengths of the opposed linear potions of each ring waveguides 18a, 24a, 28a are set equal to each other. The lengths of the linear portions of the ring waveguides 18a, 24a, 28a arranged to optically coupled with the linear waveguide 10 are set at, e.g., $l_1$. The lengths of the other opposed linear portions of the ring waveguides 18a, 24a, 28a are set, when the length of the linear portions is set $l_2$ in the ring waveguide 18a, at $l_2-\Delta l_2$ in the ring waveguide 24a and at $l_2+\Delta l_2$ in the ring waveguides 28a.

The resonance wavelengths of such ring waveguides 18a, 24a, 28a are expressed as follows.

When the effective refractive index of the ring waveguides 18a, 24a, 28a is n, the optical distances of the ring waveguides 18a, 24a, 28a are expressed respectively to be $2n(\pi r+l_1+l_2)$, $2n(\pi r+l_1+l_2-\Delta l_2)$ and $2n(\pi r+l_1+l_2+\Delta l_2)$. The resonance wavelength is 1 over integers of the optical distance, and when the integer is m, the resonance wavelengths of the ring waveguides 18a, 24a, 28a are expressed respectively to be $2n(\pi r+l_1+l_2)/m$, $2n(\pi r+l_1+l_2-\Delta l_2)/m$ and $2n(\pi r+l_1+l_2+\Delta l_2)/m$. That is, the resonance wavelengths of the ring waveguides 24a, 28a are resonance wavelengths apart from the resonance wavelength of the ring waveguide 18a by $\Delta\lambda=2n\Delta l_2/m$.

As described above, in the present embodiment as well, the ring waveguide 18a, the ring waveguide 24a whose wavelength is shorter by $\Delta\lambda$ than the resonance wavelength of the ring waveguide 18a and the ring waveguide 28a whose wavelength longer by $\Delta\lambda$ than the resonance wavelength of the ring waveguide 18a can be provided.

Thus, according to the present embodiment, while wavelength deviations between the input light and the optical resonator 12a are allowed in a wide wavelength range, the resonance wavelength of the optical resonator 12a can be easily agreed with the wavelength of the input light. The resonance of the optical resonator 12a can be intensified, and the modulation efficiency can be improved.

A Third Embodiment

An optical semiconductor device according to a third embodiment will be described with reference to FIG. 16. The same members of the present embodiment as those of the optical semiconductor device according to the first and the second embodiment illustrated in FIGS. 1 to 15 are represented by the same reference numbers not to repeat or to simplify the description.

Figure 16:
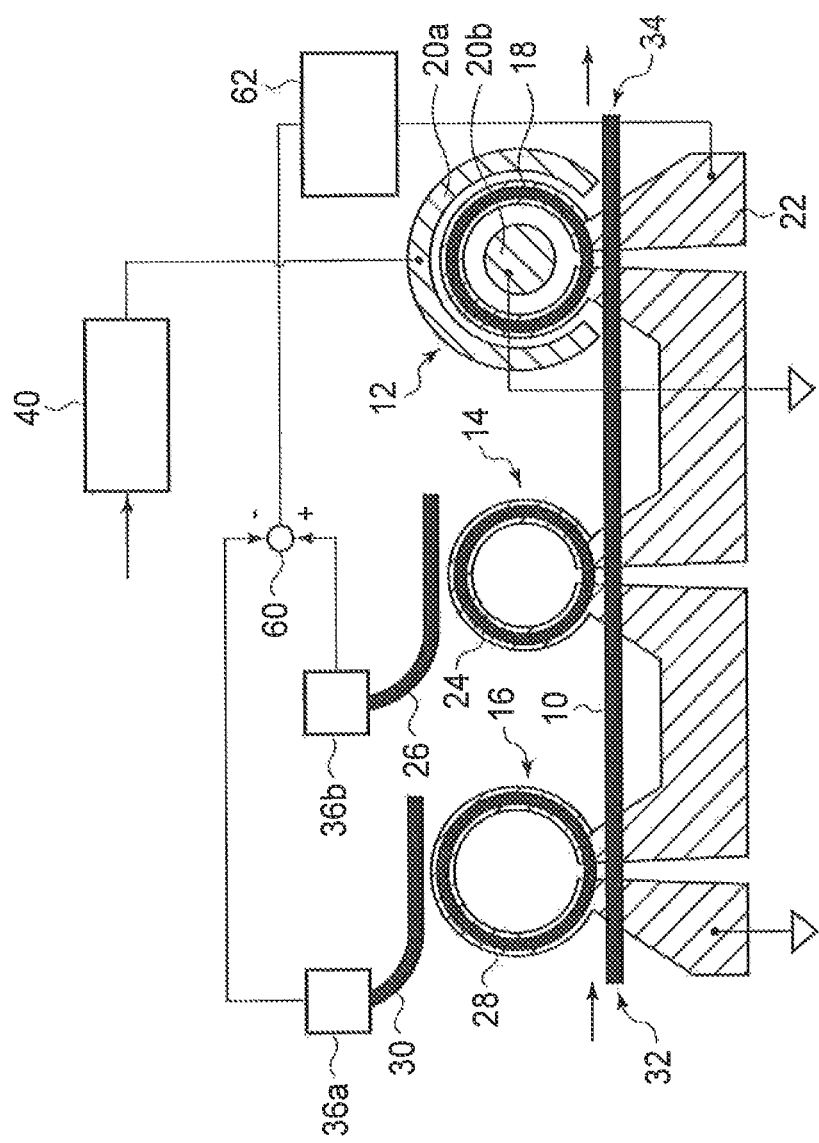
FIG. 16 is a diagrammatic view illustrating an optical semiconductor device according to a third embodiment.

FIG. 16 is a diagrammatic sectional view illustrating the optical semiconductor device according to the present embodiment.

The optical semiconductor device according to the present embodiment is the same as the optical semiconductor device according to the first embodiment except that the second optical resonator 14 and the third optical resonator 16 are oppositely arranged.

With the second optical resonator 14 and the third optical resonator 16 oppositely arranged, the optical semiconductor device can act in the same way as the optical semiconductor device according to the first embodiment.

As described above, in the optical semiconductor device according to the present embodiment, while wavelength deviations between the input light and the optical resonator 12 are allowed in a wide wavelength range, the resonance wavelength of the optical resonator 12 can be easily agreed with the wavelength of the input light. The resonance of the optical resonator 12 can be intensified, and the modulation efficiency can be improved.

A Fourth Embodiment

An optical semiconductor device according to a fourth embodiment will be described with reference to FIG. 17. The same members of the present embodiment as those of the optical semiconductor device according to the first to the third embodiment illustrated in FIGS. 1 to 16 are represented by the same reference numbers not to repeat or to simplify the description.

Figure 17:
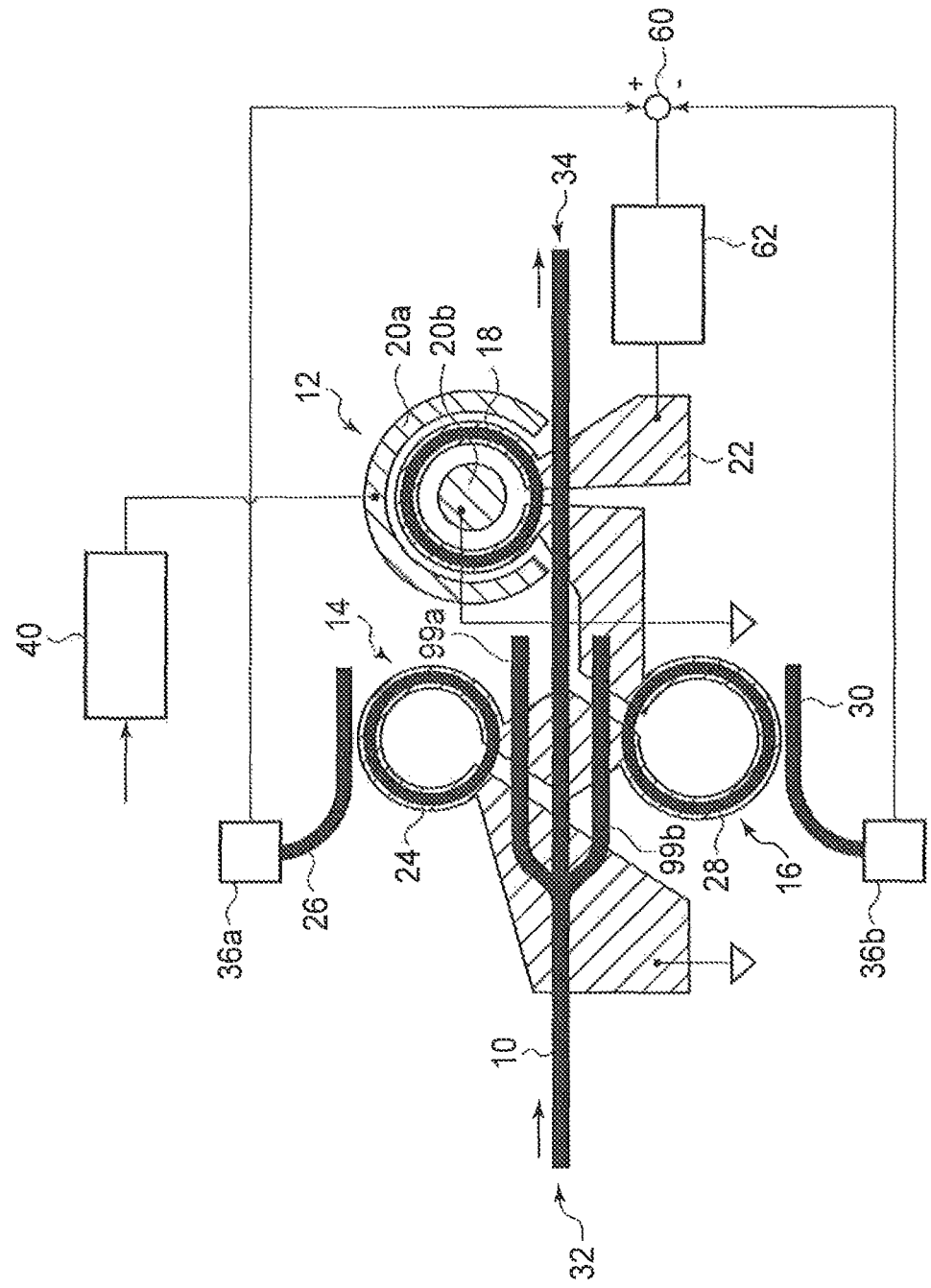
FIG. 17 is a diagrammatic view illustrating an optical semiconductor device according to a fourth embodiment.

FIG. 17 is a diagrammatic view illustrating the optical semiconductor device according to the present embodiment.

In the present embodiment, the second optical resonator 14 and the third optical resonator 16 are arranged to optically couple with waveguides (branch waveguides) 99a, 99b branched from the linear waveguide 10.

That is, as illustrated in FIG. 17, the waveguides 99a, 99b are branched from the linear waveguide 10. The second optical resonator 14 is arranged to optically couple with the waveguide 99a. The third optical resonator 16 is arranged to optically couple with the waveguide 99b.

The second optical, resonator 14 and the third optical resonator 16 are provided at the waveguides 99a, 99b branched from the linear waveguide 10, whereby the temperature control for agreeing the resonance wavelength of the optical resonator 12 with the wavelength of the input light can be improved.

For example, in the first embodiment, the third optical resonator 16 is positioned downstream of the second optical resonator 14, whereby the light quantity of the CW light to be guided to the third optical resonator 16 is decreased by a light quantity of the CW light guided by the second optical resonator 14. In such case, the peak value of the monitored current curve S1 and the peak value of the monitored current curve S2 are different from each other, and the intersection between the monitored current curve S1 and the monitored current curve S2 does not surely locate at the intermediate point between the peak wavelengths. With the intersection between the monitored current curve S1 and the monitored current curve S2 shifted from the intermediate point, the wavelength of the CW light and the resonance wavelength of the ring waveguide 18 cannot be agreed with each other even by so controlling the heater 22 to agree the monitored current I1 and the monitored current I2 with each other.

The waveguides 99a, 99h are branched from the linear waveguide 10, whereby the light quantity of the CW light to be guided to the second optical resonator 14 and the light quantity of the CW light to be guided to the third optical resonator 16 can be made equal to each other. Thus, the peak value of the monitored current curve S1 and the peak value of the monitored current curve S2 are agreed with each other to position the intersection between the monitored current curve S1 and the monitored current curve S2 at the intermediate point between the peak wavelengths.

As described above, according to the present embodiment, the second optical resonator 14 and the third optical resonator 16 are provided at the waveguides 99a, 99b branched from the linear waveguide 10, whereby the temperature control can be improved in agreeing the resonance wavelength of the optical resonator 12 with the wavelength of the input light.

A Fifth Embodiment

The optical semiconductor device according to a fifth embodiment will be described with reference to FIG. 18. The same members of the present embodiment as those of the optical semiconductor device according to the first to the fourth embodiments illustrated in FIGS. 1 to 17 are represented by the same reference numbers not to repeat or to simplify the description.

Figure 18:
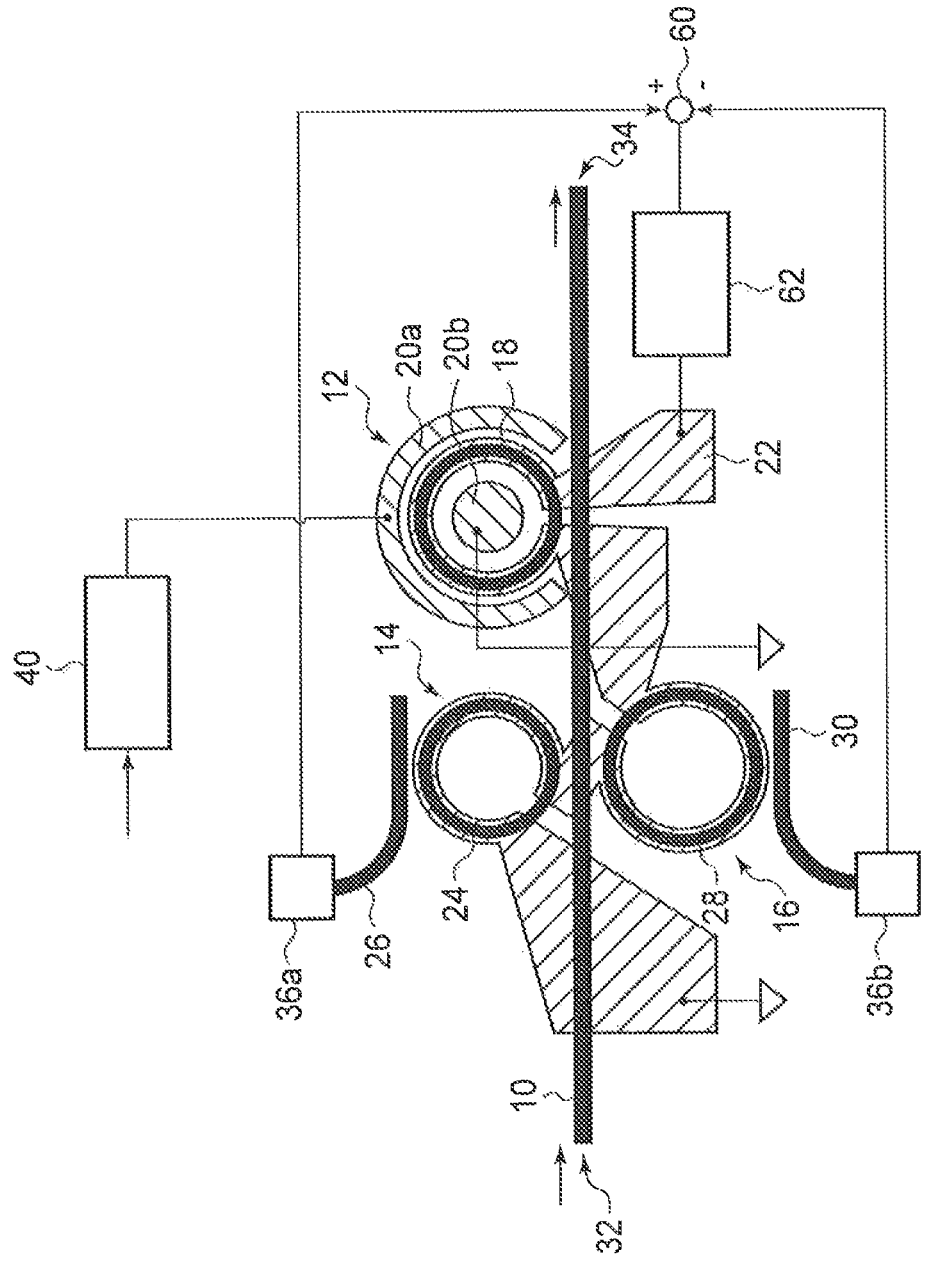
FIG. 18 is a diagrammatic view illustrating an optical semiconductor device according to a fifth embodiment.

FIG. 18 is a diagrammatic view illustrating the optical semiconductor device according to the present embodiment.

The optical semiconductor device according to the present embodiment is the same as the optical semiconductor device according to the first embodiment except that, as illustrated in FIG. 18, the second optical resonator 14 and the third optical resonator 16 are so arranged to optical couple with each other at the same position of the linear waveguide 10.

The second optical resonator 14 and the third optical resonator 16 are optically coupled with each other at the same position of the linear waveguide 10, whereby the light quantity of the CW to be guided to the second optical resonator 14 and the light quantity of the CW light to be guided to the third optical resonator 16 can be made equal to each other. Thus, the peak value of the monitored current curve S1 and the peak value of the monitored current curve S2 are agreed with each other, and the intersection between the monitored current curve S1 and the monitored current curve S2 can be positioned at the intermediate point between the peak wavelengths.

As described above, according to the present embodiment, the second optical resonator 14 and the third optical resonator 16 are provided at the same position of the linear waveguide 10, whereby the temperature control can be improved in agreeing the resonance wavelength of the optical resonator 12 with the wavelength of the input light.

A Sixth Embodiment

The optical semiconductor device according to a sixth embodiment will be described with reference to FIGS. 19 and 20. The same members of the present embodiment as those of the optical semiconductor device according to the first to the fifth embodiments illustrated in FIGS. 1 to 18 are represent by the same reference numbers not to repeat or to simplify the description.

Figure 19:
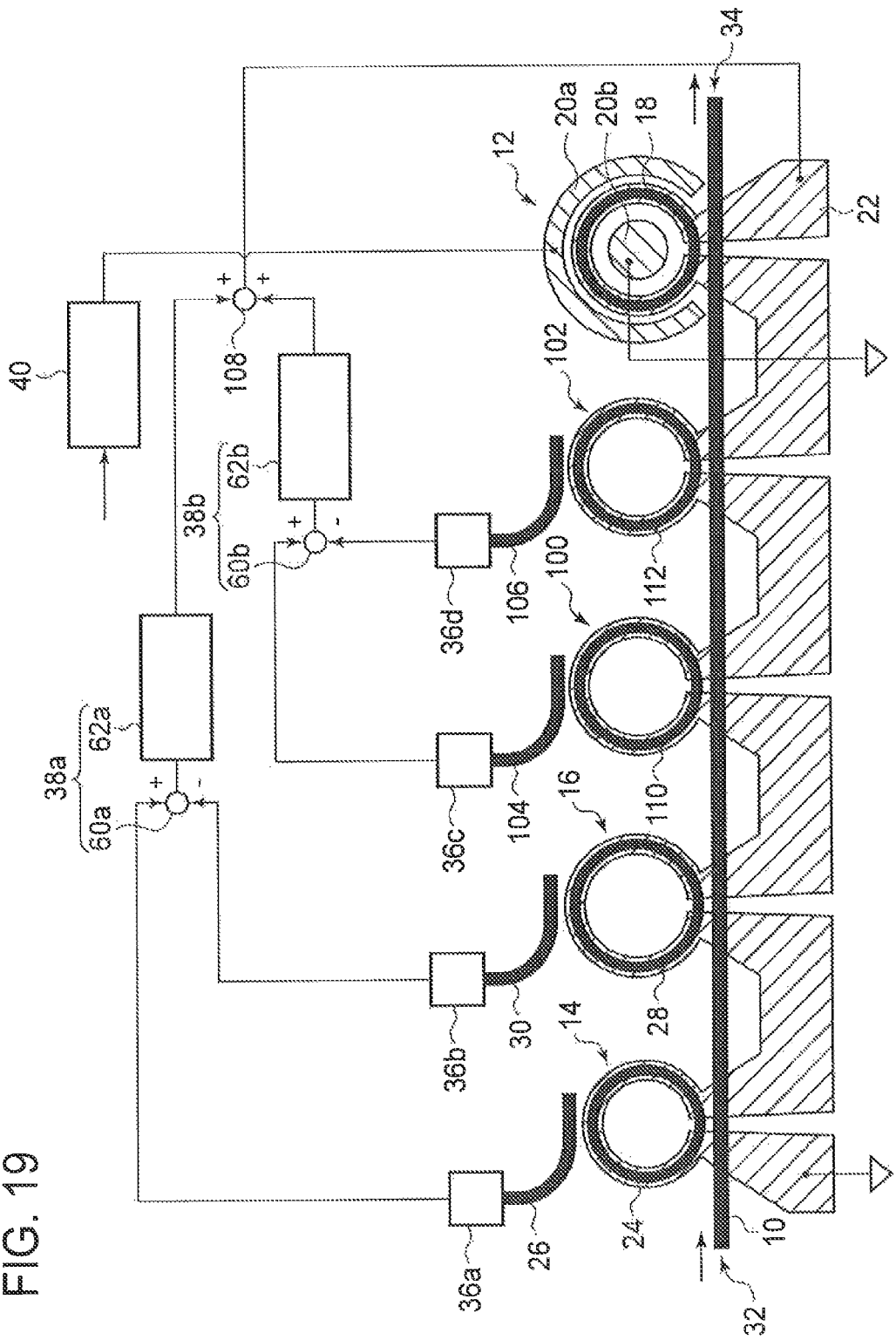
FIG. 19 is a diagrammatic view illustrating an optical semiconductor device according to a sixth embodiment.

FIG. 19 is a diagrammatic view illustrating the optical semiconductor device according to the present embodiment.

Figure 20:
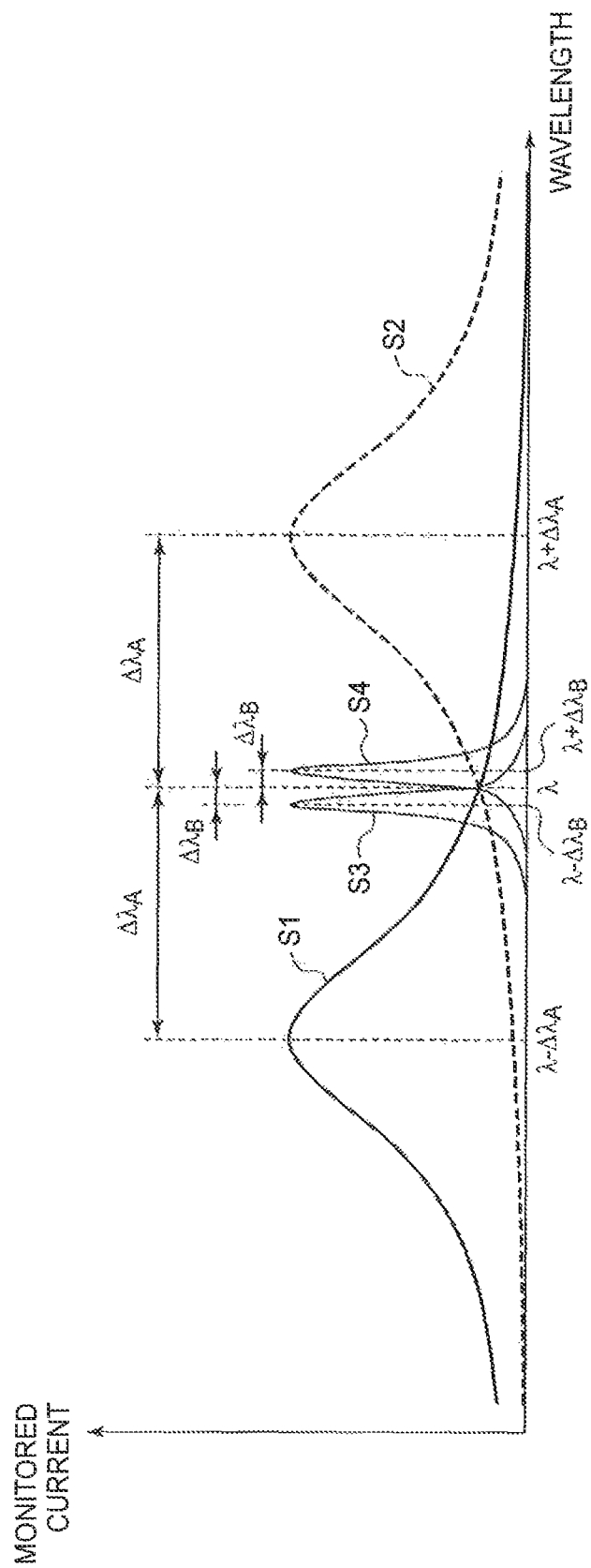

FIG. 20 is a graph illustrating relationships between a monitored current and a wavelength of an input light.

First, the structure of the optical semiconductor device according to the present embodiment will be described with reference to FIG. 19.

The optical semiconductor device according to the present embodiment is the optical semiconductor device according to the first embodiment illustrated in FIG. 1 further including two optical resonances for the monitor. That is, as illustrated in FIG. 19, a fourth optical resonator 100 and a fifth optical resonator 102 are so further provided to optically couple with the linear waveguide 10. Photodetectors 36c, 36d having waveguides 104, 106 are further provided.

The fourth optical resonator 100 includes a ring waveguide 110 and the heater 22 arranged near the ring waveguide 110.

The fifth optical resonator 102 includes a ring waveguide 112 and the heater 22 arranged near the ring waveguide 112.

The diameters of the ring waveguides 18, 24, 28, 110, 112 are set respectively at d, d−$\Delta d_A$, d+$\Delta d_A$, d−$\Delta d_b$ and d+$\Delta d_B$. In the present embodiment, for example, $\Delta d_A$ is set larger than $\Delta d_B$.

The interval between the linear waveguide 10 and the ring waveguides 24, 28 is set smaller than the interval between the linear waveguide 10 and the ring waveguides 110, 112. The interval between the linear waveguide 10 and the ring waveguides 110, 112 is set smaller than the interval between the linear waveguides 10 and the ring waveguide 18. For example, the interval between the linear waveguide 10 and the ring waveguides 24, 28 is set at 100 nm, the interval between the linear waveguide 10 and the ring waveguides 110, 112 is set at 200 nm, and the interval between the linear waveguide 10 and the ring waveguide 18 is set at 250 nm.

The photodetector 36c is optically coupled with the ring waveguide 110 via the waveguide 104. The photodetector 36d is optically coupled with the ring waveguide 112 via the waveguide 106.

A controller 38a includes a current subtraction circuit 60a connected to the photodetectors 36a, 36b, and a PID control circuit 62a connected to the current subtraction circuit 60a. A controller 38b includes a current subtraction circuit 60b connected to the photodetectors 36c, 36d, and a PID control circuit 62b connected to the current subtraction circuit 60b.

A voltage addition circuit 108 is connected to the PID control circuits 62a, 62b. The voltage addition circuit 106 adds a drive signal outputted from the PID control circuit 62a and a drive signal outputted from the PID control circuit 62b.

Next, the operation of the optical semiconductor device according to the present embodiment will be described with reference to FIG. 20.

When the wavelength of the CW light agrees with the resonance wavelength of the ring waveguide 18, the optical semiconductor device according to the present embodiment operates in the same way as the optical semiconductor device according to the first embodiment.

When the wavelength of the CW light does not agree with the resonance wavelength of the ring waveguide 18, the second optical resonator 11, the third optical resonator 16, the fourth optical resonator 100, the fifth optical resonator 102 and the heater 22 are used to agree the wavelength of the CW light and the resonance wavelength of the ring waveguide 18 with each other.

The CW light inputted to the linear waveguide 10 is guided not only to the ring waveguide 18 but also to the ring waveguides 24, 23, 110, 112. The CW light guided to the ring waveguides 24, 28, 110, 112 and detected by the photodetectors 36a, 36b, 36c, 36d.

The monitored currents I1, I2, I5 I6 detected by the photodetectors 36a, 36b, 36c, 36d have the wavelength characteristics as illustrated in FIG. 20. In FIG. 20, the monitored current curve S1 indicates the wavelength characteristics of the monitored current I1. The monitored current curve S2 indicates the wavelength characteristics of the monitored current I2. The monitored current curve S3 indicates the wavelength characteristics of the monitored current I5. The monitored current curve S4 indicates the wavelength characteristics of the monitored current I6.

As illustrated in FIG. 20, the peak wavelengths of the monitored current curves S3, S4 position between the peak wavelength of the monitored current curve S1 and the peak wavelength of the monitored current curve S2. This is because the ring waveguides 24, 28, 110, 112 are so designed that $\Delta\lambda_B$ becomes smaller than $\Delta\lambda_A$, i.e., $\Delta d_B$ becomes smaller than $\Delta d_A$.

The wavelength, range of the peaks of the monitored current curves S3, S4 is narrower than the wavelength range of the peaks of the monitored current curves S1, S2. This is because the interval between the linear waveguide 10 and the ring waveguides 110, 112 is set larger than the interval between the linear waveguide 10 and the ring waveguides 24, 28.

The monitored currents I1, I2 detected by the photodetectors 36a, 36b are converted to a current I3 given by subtracting the monitored current I2 from the monitored current I1. The monitored current I5, I6 detected by the photodetectors 36c, 36d are converted to a current I7 given subtracting the monitored current I6 from the monitored current I5.

The PID control circuits 62a, 62b feedback control the heater 22 so that the currents I3, I7 become zero, based on the currents I3, I7 generated by the current subtraction circuits 60a, 60b.

When the currents I3, I7 are not zero, the PID control circuits 62a, 62b judge that the wavelength $\lambda_1$ of the input light and the resonance wavelength $\lambda$ of the first optical resonator 12 do not agree with each other and output the drive signal to the heater 22.

The drive signal outputted from the PID control circuit 62a and the drive signal outputted from the PID control circuit 62b are added to each other by the voltage addition circuit 108 to be transmitted to the heater 22.

After the heating by the heater 22, the PID control circuits 62a, 62b again measures the currents I3, I7 to check whether the currents I3, I7 are zero. When the currents I3, I7 are zero, the PID control circuits 62a, 62b retain the drive signal to be outputted to the heater 22, when the currents I3, I7 are not zero, the PID control circuits 62, 62b suitably increase or decrease the drive signal to drive the heater 22 corresponding to values, of the currents I3, I7.

The PID control circuits 62a, 62b continuously makes such feedback control to control the heater 22 so that the currents I3, I7 stabilize near zero. Thus, the wavelength $\lambda_1$ of the input light and the resonance wavelength $\lambda$ of the first optical resonator 12 can be agreed with each other.

Not only the current I3 but also the current I7 are used to control the heater 22 because, as described above, the monitored current curve S1 and the monitored current curve S2 often intersect each other, shifting from the wavelength $\lambda$, and in such case, the wavelength of the CW light and the resonance wavelength of the ring waveguide 18 shift from each other.

In such case, the fourth optical resonator 100 and the fifth optical resonator 102 are further used to correct the shift between the wavelength of the CW light and the resonance wavelength of the ring waveguide 18.

Because of the interval between the linear waveguide 10 and the ring waveguides 110, 112 larger than the interval between the linear waveguide 10 and the ring waveguides 24, 28, the wavelength range of the peaks of the monitored current curves S3, S4 becomes smaller than the wavelength range of the peaks of the monitored current curves S1, S2. Thus, the wavelength control of higher precision than the wavelength control by using the current I3 alone can be made.

As described above, in the present embodiment, in addition to the optical resonator 12 for modulating the input light, the optical resonators 14, 16, 100, 102 whose resonance wavelengths are shorter and longer by $\Delta\lambda_A$ and by $\Delta\lambda_B$ are provided. By using the output signals from these optical resonators 14, 16, 100, 102, the temperature control is so made that the resonance wavelength of the optical resonator 12 agrees with the wavelength of the input light.

Thus, according to the present embodiment, the wavelength control in the wide wavelength range, and the wavelength control in the narrow wavelength range but of high precision are combined, which makes it possible to make the wavelength control of high precision in the wide wavelength range.

A Seventh Embodiment

An optical semiconductor device according to a seventh embodiment will be described with reference to FIGS. 21 to 23. The same members of the present embodiment as those of the optical semiconductor device according to the first to the sixth embodiments illustrated in FIGS. 1 to 20 are represented by the same reference numbers not to repeat or to simplify the description.

Figure 21:
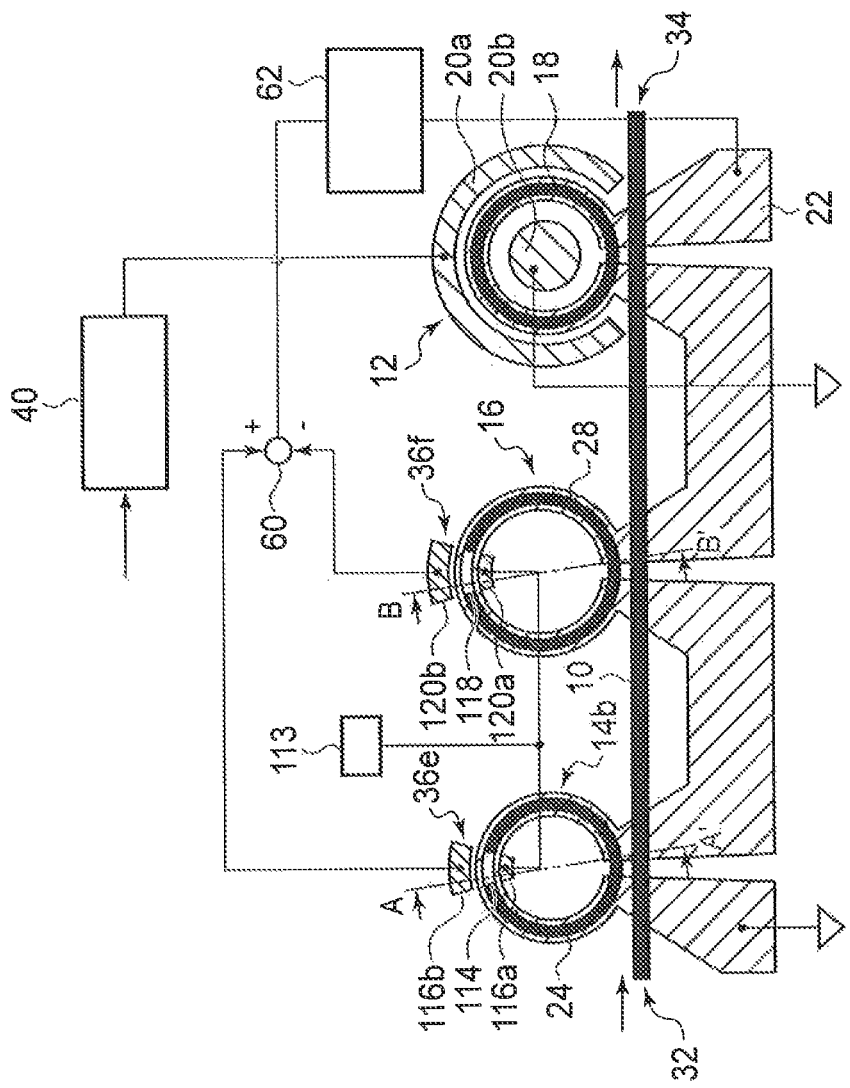
FIG. 21 is a diagrammatic view illustrating an optical semiconductor device according to a seventh embodiment.

FIG. 21 is a diagrammatic view illustrating the optical semiconductor device according to the present embodiment. FIGS. 22 and 23 are cross-sectional views illustrating the optical semiconductor device according to the present embodiment.

The optical semiconductor device according to the present embodiment is the same as the optical semiconductor device according to the first embodiment except that, as illustrated in FIG. 21, a photodetector 36e and a photodetector 36f are provided in place of the photodetectors 36a, 36b.

Figure 22:
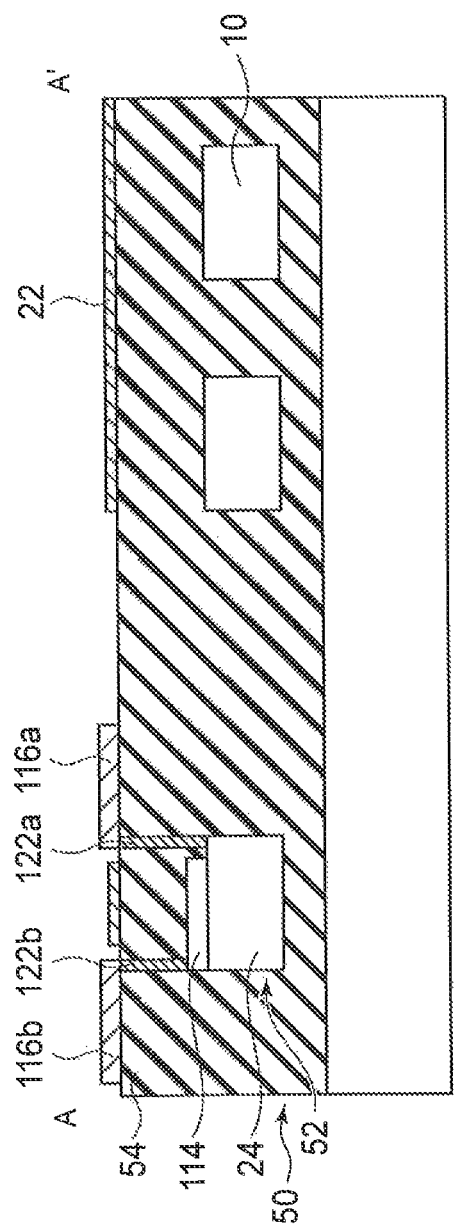
FIGS. 22 and 23 are cross-sectional views illustrating the optical semiconductor according to the seventh embodiment.
Figure 23:
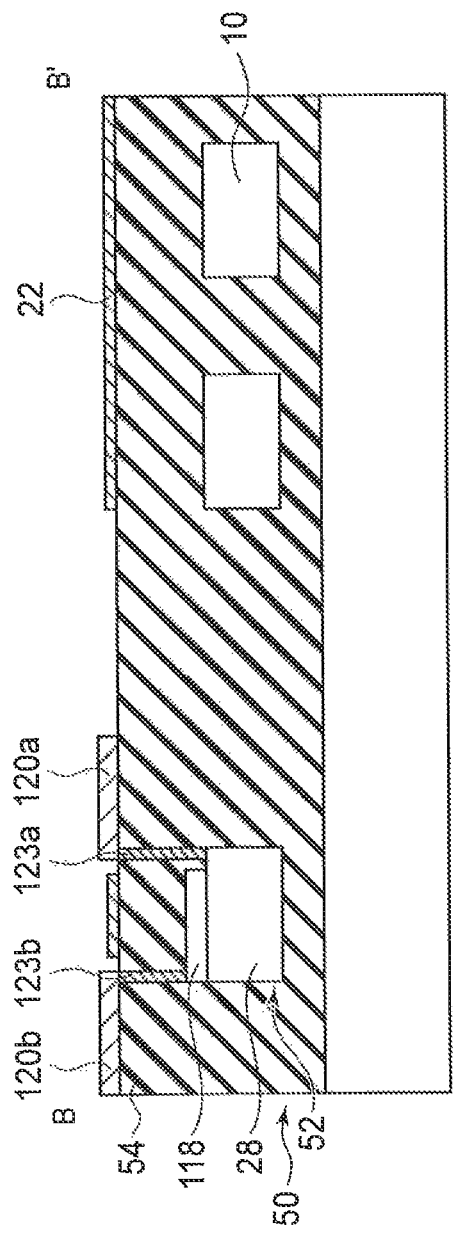

As exemplified in FIGS. 22 and 23, the photodetectors 36e, 36f are formed of parts of the ring waveguides 24, 28. In the regions of the parts of the ring waveguides 24, 28, a first conductivity type (e.g., n-type) impurity is doped, and thereon, photoabsorption parts 114, 118 of a second conductivity type (e.g., p-type) of, e.g., Ge or others are formed.

Above the silicon oxide film 54, an electrode 116a connected to the ring waveguide 24 via a via-interconnection 122a, and an electrode 116b connected to the photoabsorption part 114 via a via-interconnection 122b are formed. Also, an electrode 120a connected to the ring waveguide 28 via a via-interconnection 123a, and an electrode 120b connected to the photoabsorption part 118 via a via-interconnection 123a are formed. The electrodes 116a, 120a are connected to a power source 113. The electrodes 116b, 120b are connected to the current subtraction circuit 60. The electrodes 116a, 116b, 120a, 120b are formed of, e.g., aluminum. The via-interconnections 122a, 122b, 123a, 123b are formed of, e.g., tungsten.

As described above, in the photodetectors 36e, 36f, the parts of the ring waveguides 24, 28 of the first conductivity type and the photoabsorption parts 114, 118 of the second conductivity type form p-n junctions. Accordingly, a reverse bias is applied to the p-n junctions, whereby light absorbed by the photoabsorption parts 114, 118 can be detected as monitored currents I1, I2.

As described above, according to the present embodiment, the photodetectors 36e, 36f can be formed in the partial regions of the ring waveguides 24, 28.

An Eighth Embodiment

An optical semiconductor device according to an eighth embodiment will be described with reference to FIGS. 24 and 25. The same members of the present embodiment as those of the optical semiconductor device according to the first to the seventh embodiments illustrated in FIGS. 1 to 23 are represented by the same reference numbers not to repeat or to simplify the description.

Figure 24:
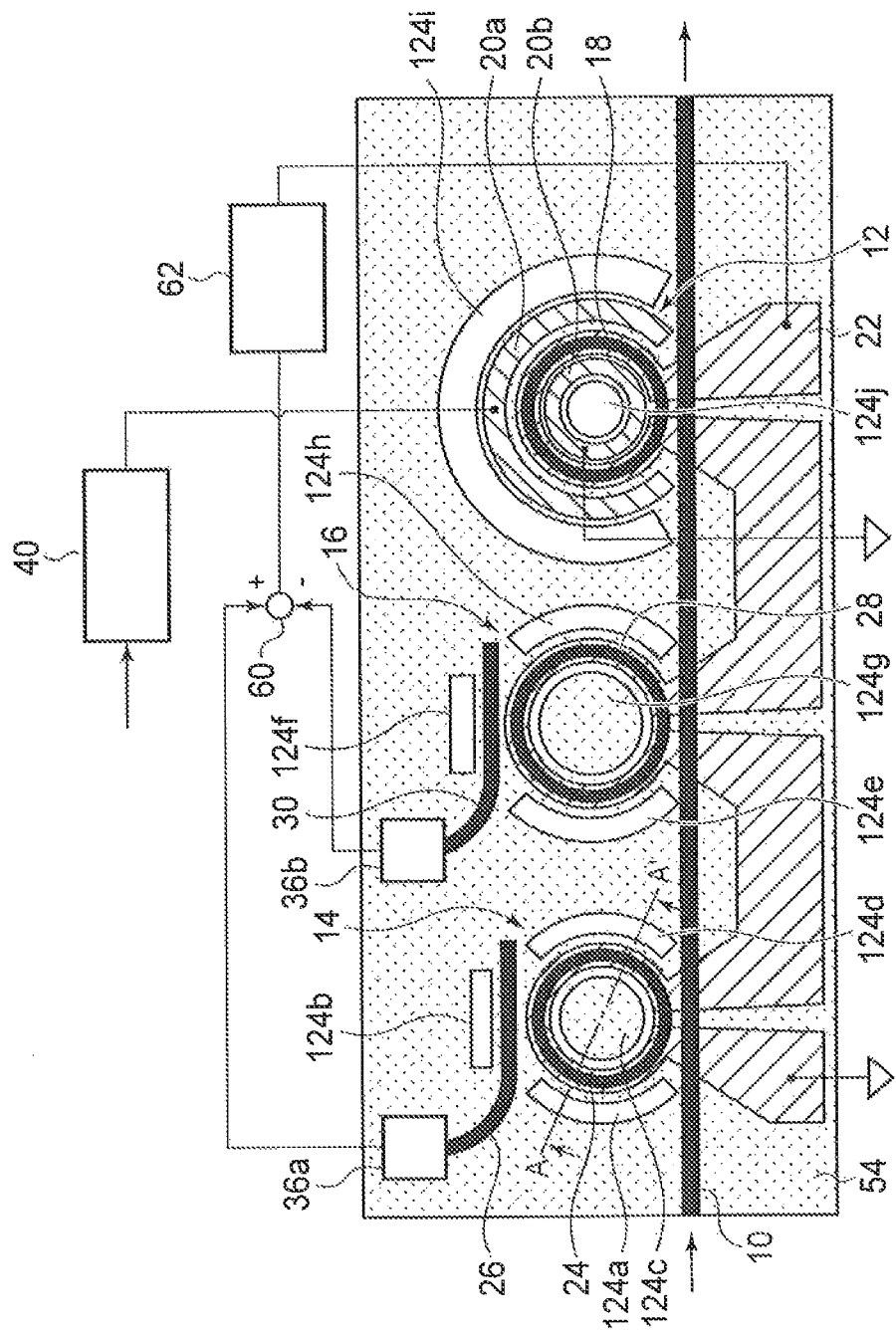
FIG. 24 is a diagrammatic view illustrating an optical semiconductor device according to an eighth embodiment.

FIG. 24 is a diagrammatic view illustrating the optical semiconductor device according to the present embodiment. FIG. 25 is the A-A' line cross-sectional view of FIG. 24.

The optical semiconductor device according to the present embodiment is the same as the optical semiconductor device according to the first embodiment except that thermal insulation trenches 124a-124j are formed around the ring waveguides 18, 24, 28.

The thermal insulation trenches 124a-124j are formed around the ring waveguides 18, 24, 28, whereby the diffusion of heat generated by the heater 22 can be suppressed, and the temperature control efficiency can be improved.

Figure 25:
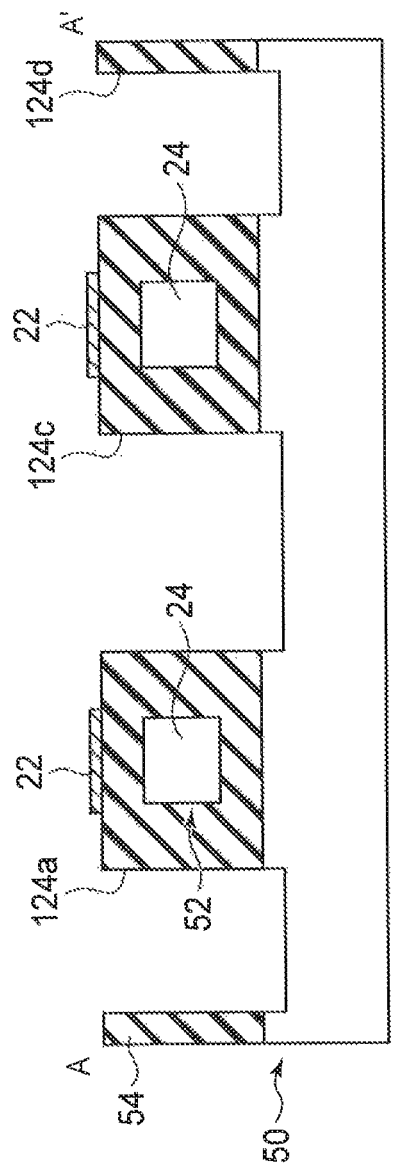
FIG. 25 is a cross-sectional view illustrating the optical semiconductor according to the eighth embodiment.

As exemplified in FIG. 25, the thermal insulation trenches 124a-124j may be formed by etching the SOI substrate 50 and the silicon oxide layer 54 around the ring waveguides 18, 24, 28.

As described above, according to the present embodiment, the thermal, insulation trenches 124a-124j are formed around the ring waveguides 18, 24, 28, whereby the diffusion of heat generated by the heater 22 can be suppressed, and the temperature control efficiency can be improved.

A Ninth Embodiment

An optical semiconductor device according to a ninth embodiment will be described with reference to FIG. 26. The same members of the present embodiment as those of the optical semiconductor device according to the first to the eighth embodiments illustrated in FIGS. 1 to 25 are represented by the same reference numbers not to repeat or to simplify the description.

Figure 26:
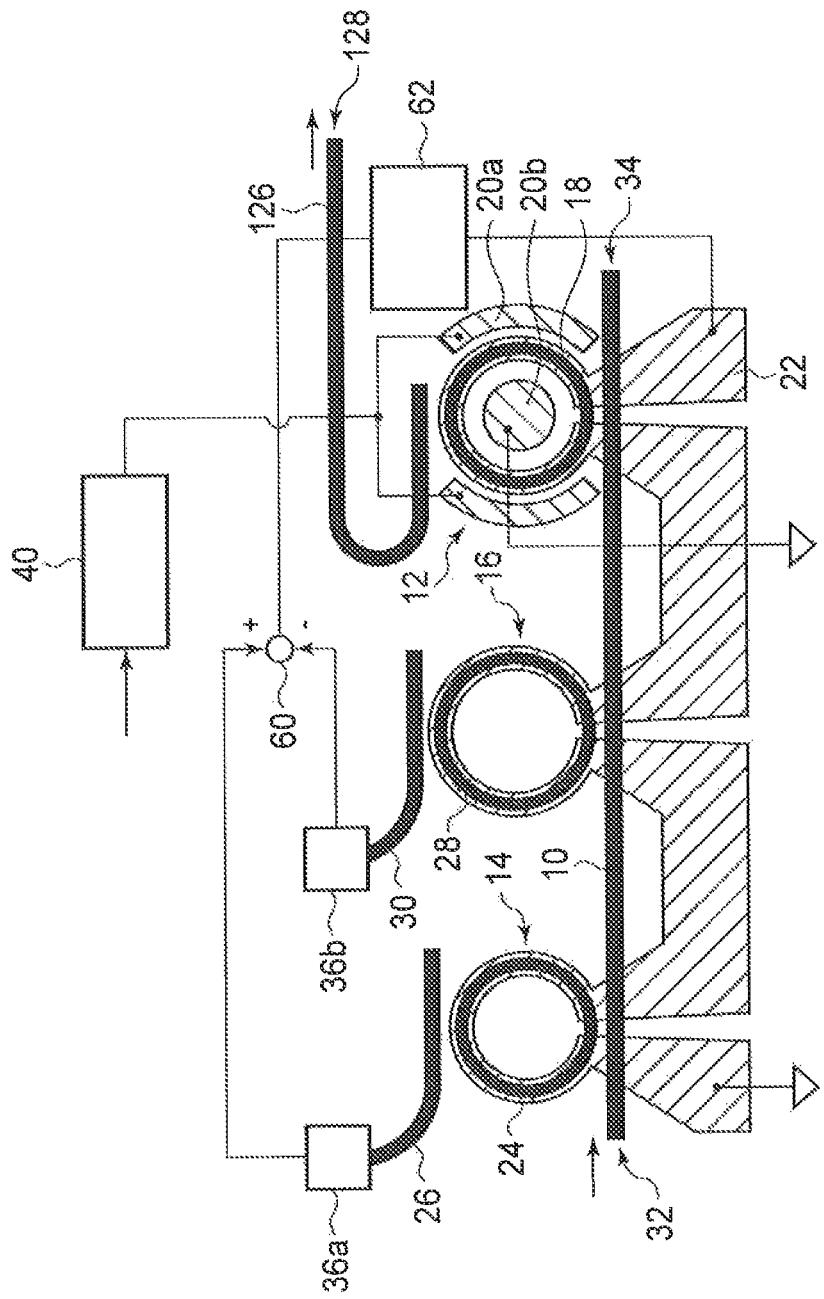
FIG. 26 is a diagrammatic view illustrating an optical semiconductor device according to a ninth embodiment.

FIG. 26 is a diagrammatic view illustrating the optical semiconductor device according to the present embodiment.

The optical semiconductor device according to the present embodiment is the same as the optical semiconductor device according to the first embodiment illustrated in FIG. 1 except that output light is outputted from a waveguide 126 arranged to optically couple with the ring waveguide 18.

In the present embodiment, light to be guided to the ring waveguide 18 is outputted from the output terminal 128. Accordingly, the modulated light output power becomes maximum, as the modulated light output power of the optical resonator 12 exemplified in FIG. 10, when the transmittance from the linear waveguide 10 to the ring waveguide 18 becomes maximum. That is, in the optical semiconductor device according to the present embodiment, the modulated signal inverse to that of the optical semiconductor device according to the first embodiment can be obtained.

As described above, according to the optical semiconductor device according to the present embodiment, the wavelength shift between the input light and the optical resonator 12 is allowed in a wide wavelength range while the resonance wavelength of the optical resonator 12 can be easily agreed with the wavelength of the input light. The resonance of the optical resonator 12 can be intensified, and the modulation efficiency can be improved.

A Tenth Embodiment

The optical semiconductor device according to a tenth embodiment will be described with reference to FIG. 27. The same members of the present embodiment as those of the optical semiconductor device according to the first to the ninth embodiments illustrated in FIGS. 1 to 26 are represented by the same reference numbers not to repeat or to simplify the description.

Figure 27:
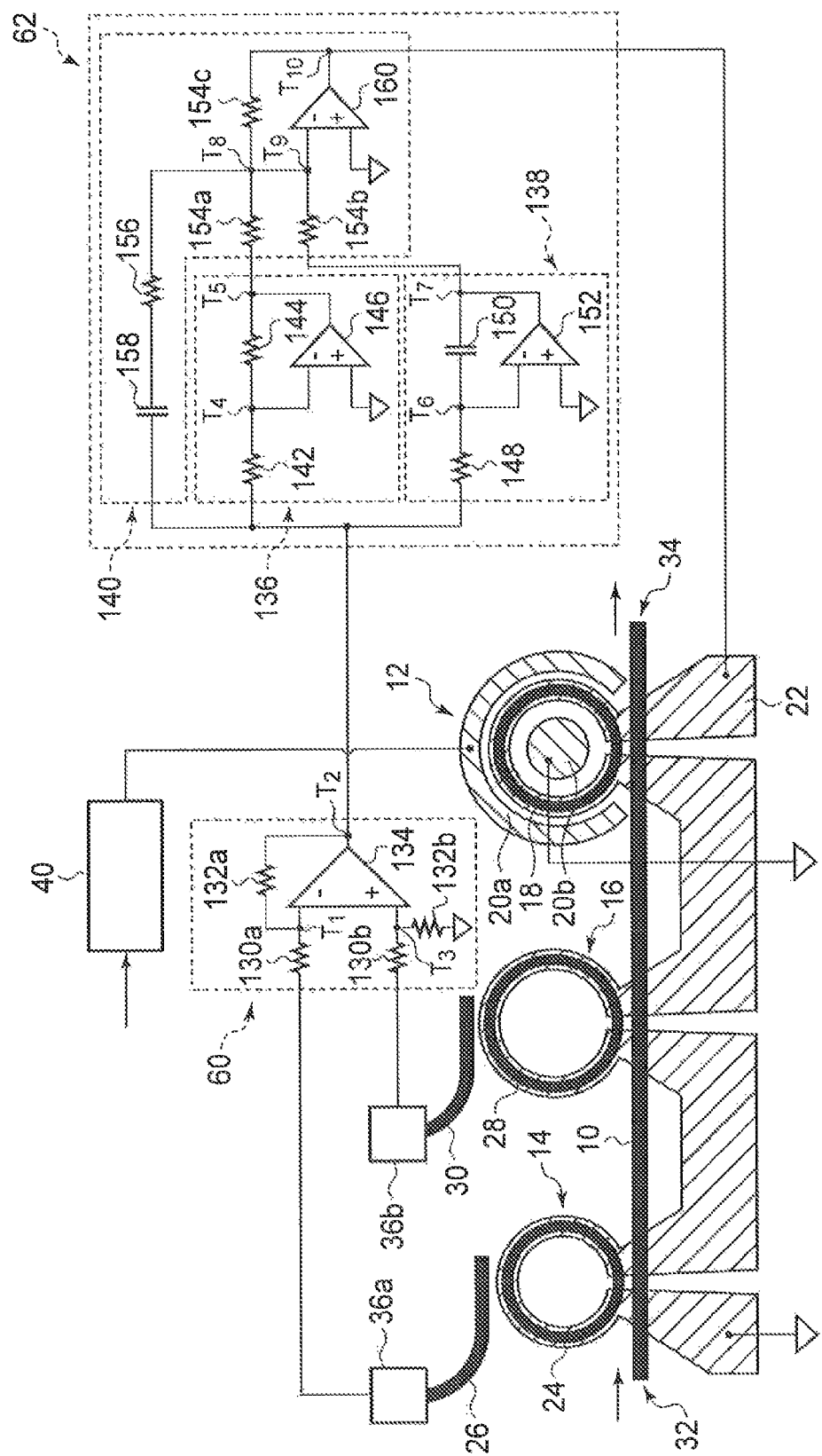
FIG. 27 is a diagrammatic view illustrating an optical semiconductor device according to a tenth embodiment.

FIG. 27 is a diagrammatic view illustrating the optical semiconductor device according to the present embodiment.

In the present embodiment, specific examples of the current subtraction circuit 60 and the PID control circuit 62 will be described.

As exemplified in FIG. 27, the current subtraction circuit 60 includes resistors 130a, 130b of a resistance value $R_1$, resistors 132a, 132b of a resistance value $R_2$, and operational amplifier 134. The resistor 130a have one end connected to the photodetector 36a and the other end connected to the minus input terminal of the operation amplifier 134. The resistor 130b has one end connected to the photodetector 36b and the other end connected to the plus input terminal of the operational amplifier 134. The resistor 132a has one end connected to a node T1 provided between the resistor 130a and the operational amplifier 134 and the other end connected to a node T2 provided between the output terminal of the operational amplifier 134 and the input terminal of the PID control circuit 62. The resistor 132b has one end connected to a node T3 provided between the resistor 130b and the plus input terminal of the operational amplifier 134 and the other end connected to the ground line.

The PID control circuit 62 includes a proportional control circuit (negative feedback amplifier circuit) 136, an integral control circuit 138 and a differential control circuit 140. The operational control circuit is a circuit for controlling an input value to be a linear function of the deviation between an output value and a target value. The integral control circuit is a circuit for changing the input value in proportion with the time integral of the deviation between the output value and the target value. The differential control circuit is a circuit for changing the input value in proportion with a time differential of the deviation between, the output value and the target value.

As exemplified in FIG. 27, the proportional control circuit 136 includes a resistor 142 of a resistance value $R_{P1}$ and a resistor 144 of a resistance value $R_{P2}$ and an operational amplifier 146. The resistor 142 and the resistor 144 are serially connected to each other. The resistor 142 has one end connected to the output terminal of the operational amplifier 134. The resistor 142 has one end connected to the output terminal of the operational amplifier 134, and the resistor 144 has one end connected to a resistor 154a of the differential control circuit 140. The operational amplifier 146 has the plus input terminal connected to the ground line. The operational amplifier 146 has the minus input terminal connected to a node T4 provided between the resistor 142 and the resistor 144. The operational amplifier 146 has the output terminal connected to a node T5 provided between the resistor 144 and the resistor 154a of the differential control circuit 140.

As exemplified in FIG. 27, the integral control circuit 138 includes a resistor 148 of a resistance value $R_I$, a capacitor 150 of a capacitance value $C_I$ and an operational amplifier 152. The resistor 148 and the capacitor 150 are serially connected to each other. The resistor 148 has one end connected to the output terminal of the operational amplifier 134, and the capacitor 150 has one end connected to the resistor 154b of the differential control circuit 140. The operational amplifier 152 has the plus input terminal connected to the ground line. The operational amplifier 152 has the minus input terminal connected to a node T6 provided between the resistor 148 and the capacitor 150. The operational amplifier 152 has the output terminal connected to a node T7 provided between the capacitor 150 and the resistor 154b of the differential control circuit 140.

As exemplified in FIG. 27, the differential control circuit 140 includes resistors 154a, 154b and 154c of a resistance value $R_D$, a resistor 156 of a resistance value $R_D'$, a capacitor 158 of a capacitance value $C_D$ and an operational amplifier 160. The resistor 156 and the capacitor 160 are serially connected to each other. The resistor 156 has one end connected to the minus input terminal of the operational amplifier 154, and the capacitor 158 has one end connected to the output terminal of the operational amplifier 134. The operational amplifier 160 has the plus input terminal connected to the ground line. The operational amplifier 160 has the output terminal connected to the heater 22. The resistor 154a has one end connected to a node T8 provided between the resistor 156 and the minus input terminal, of the operational amplifier 160. The resistor 154b has one end connected to a node T9 provided between the resistor 156 and the minus input terminal of the operational amplifier 160. The resistor 154c has one end connected to a node T8 provided between the resistor 156 and the minus input terminal of the operational amplifier 160 and has the other end connected to a node T10 provided between the output terminal of the operational amplifier 160 and the heater 22.

Such current subtraction circuit 60 and the PID control circuit 62 are usable in the optical semiconductor device according to the first to the ninth embodiments as the current subtraction circuits 60, 60a, 60b and the PID control circuits 62, 62a, 62b.

Modified Embodiments

The above-described embodiments can cover other various modifications.

For example, in the above-described embodiments, the optical resonators 12, 14, 16, 100, 102 are formed of silicon. The material forming the optical resonators 12, 14, 16, 100, 102 is no specifically limited. For example, SiGe and the other compound semiconductor materials may be used.

In the above-described embodiments, with no voltage applied between the electrodes 20a, 20b, the wavelength of the CW light and the resonance wavelength of the first optical resonator 12 are brought into agreement with each other, but this is not essential. For example, with a voltage $V_{on}$ applied between the electrodes 20a, 20b, the wavelength of the CW light and the resonance wavelength of the first optical resonator 12 may be agreed. At this time, preferably, the diameter of the ring waveguide 18 is so set suitably that with a voltage $V_{on}$ applied between the electrodes 20a, 20b, the resonance wavelength of the first optical resonator 12 becomes shorter than the wavelength of the CW light.

In the sixth embodiment, $\Delta\lambda_A$ becomes larger than $\Delta\lambda_B$, but $\Delta\lambda_A$ may become smaller than $\Delta\lambda_B$.

Except the combination of the optical semiconductor device according to the fourth embodiment and optical semiconductor device according to the fifth embodiment, the optical semiconductor devices according to the second to the ninth, embodiments can be suitably combine. For example, the optical semiconductor device according to the sixth embodiment and the optical semiconductor device according to the eighth embodiment are combined, whereby the optical semiconductor device can have high temperature control and can make the temperature control of high precision in a wide wavelength range.

What is claimed is:

1. An optical semiconductor device, comprising:
   a first waveguide that an input light is input into;
   a ring modulator arranged to optically couple with the first waveguide;
   a first ring resonator arranged to optically couple with the first waveguide and having an optical path length smaller than an optical path length of the ring modulator;
   a second ring resonator arranged to optically couple with the first waveguide and having an optical path length larger than the optical path length of the ring modulator;
   a heater arranged adjacent to the ring modulator, the first ring resonator and the second ring resonator;
   a first photodetector configured to monitor a light power in the first ring resonator;
   a second photodetector configured to monitor a light power in the second ring resonator;
   a controller controlling the heater so that a resonance wavelength of the ring modulator agrees with a wavelength of the input light, based on signals detected by the first photodetector the second photodetector;
   a third ring resonator arranged adjacent the heater to optically couple with the first waveguide, and having an optical path length which is larger than the optical path length of the first ring resonator and smaller than the optical path length of the ring modulator;
   a fourth ring resonator arranged adjacent the heater to optically couple with the first waveguide, and having an optical path length which is larger than the optical path length of the ring modulator and smaller than the optical path length of the second ring resonator;
   a third photodetector configured to monitor a light power in the third ring resonator; and
   a fourth photodetector configured to monitor a light power in the fourth ring resonator.

2. The optical semiconductor device according to claim 1, wherein
   a difference between the optical path length of the ring modulator and the optical path length of the first ring resonator is equal to a difference between the optical path length of the ring modulator and the optical path length of the second ring resonator.

3. The optical semiconductor device according to claim 1, wherein
   an interval between the first waveguide and the first ring resonator and an interval between the first waveguide and the second ring resonator are smaller than an interval between the first waveguide and the ring modulator.

4. The optical semiconductor device according to claim 1, wherein
   the first ring resonator and the second ring resonator are arranged nearer on a input terminal side of the first waveguide than the ring modulator.

5. The optical semiconductor device according to claim 1, wherein
   the first waveguide includes a first branch waveguide and a second branch waveguide,
   the first ring resonator is arranged to optically couple with the first branch waveguide, and the second ring waveguide is arranged to optically couple with the second branch waveguide.

6. The optical semiconductor device according to claim 1, wherein
the first ring resonator and the second ring resonator are arranged to optically couple with each other at a same position of the first waveguide.

7. The optical semiconductor device according to claim 1, further comprising: a second waveguide arranged to optically couple with the ring modulator,
wherein an output light is outputted from the second waveguide.

8. The optical semiconductor device according to claim 1, wherein
the first photodetector is formed in a part of the first ring resonator, and
the second photodetector is formed in a part of the second ring resonator.

9. The optical semiconductor device according to claim 1, further comprising:
a thermal insulation trench formed around the ring modulator, the first ring resonator and the second ring resonator.

10. The optical semiconductor device according to claim 1, wherein
the controller includes
a current subtraction circuit into which an output signal of the first photodetector and an output signal of the second photodetector are inputted; and
a PID control circuit controlling the heater, based on an output signal outputted from the current subtraction circuit.

11. The optical semiconductor device according to claim 10, wherein
the PID control circuit so controls the heater that the output signal to be outputted from the current subtraction circuit becomes zero.

12. The optical semiconductor device according to claim 1, wherein
a difference between the optical path length of the ring modulator and the optical path length of the third ring resonator is equal to a difference between the optical path length of the ring modulator and the optical path length of the fourth ring resonator.

13. The optical semiconductor device according to claim 1, wherein
an interval between the first waveguide and the third ring resonator, and an interval between the first waveguide and the fourth ring resonator are smaller than an interval between the first waveguide and the ring modulator and is larger than an interval between the first waveguide and the first ring resonator and an interval between the first waveguide and the second ring resonator.

14. The optical semiconductor device according to claim 13, wherein
the third ring resonator and the fourth ring resonator are arranged nearer on an input terminal side of the first waveguide than the ring modulator.

* * * * *